US011265430B2

(12) United States Patent
Nakayama

(10) Patent No.: US 11,265,430 B2
(45) Date of Patent: Mar. 1, 2022

(54) INFORMATION PROCESSING APPARATUS

(71) Applicant: FUJIFILM Business Innovation Corp., Tokyo (JP)

(72) Inventor: Shungo Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 312 days.

(21) Appl. No.: 16/208,582

(22) Filed: Dec. 4, 2018

(65) Prior Publication Data

US 2019/0253573 A1 Aug. 15, 2019

(30) Foreign Application Priority Data

Feb. 13, 2018 (JP) .............................. JP2018-022709

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *H04L 41/0803* | (2022.01) | |
| *H04L 41/0853* | (2022.01) | |
| *H04L 41/0813* | (2022.01) | |
| *H04L 61/5007* | (2022.01) | |

(52) U.S. Cl.
CPC ..... *H04N 1/00411* (2013.01); *H04L 41/0803* (2013.01); *H04L 41/0813* (2013.01); *H04L 41/0853* (2013.01); *H04L 61/2007* (2013.01)

(58) Field of Classification Search
CPC ............ H04N 1/00411; H04L 61/2007; H04L 41/0803; H04L 41/0813; H04L 41/0853
USPC ................................ 358/1.15, 1.14, 1.13, 1.1
See application file for complete search history.

(56) References Cited

U.S. PATENT DOCUMENTS

| | | | |
|---|---|---|---|
| 2011/0320952 A1 | 12/2011 | Kataoka | |
| 2014/0118517 A1* | 5/2014 | Fueki | A61B 1/00009 348/65 |
| 2015/0278564 A1* | 10/2015 | Naruse | G06F 3/1203 340/10.51 |
| 2016/0241728 A1* | 8/2016 | Naruse | H04N 1/00347 |
| 2018/0295558 A1* | 10/2018 | Kang | H04W 12/128 |

(Continued)

FOREIGN PATENT DOCUMENTS

| | | |
|---|---|---|
| JP | 2012008702 | 1/2012 |
| JP | 2017022637 | 1/2017 |
| JP | 2017079450 | 4/2017 |

(Continued)

OTHER PUBLICATIONS

"Office Action of Japan Counterpart Application", dated Nov. 24, 2021, with English translation thereof, p. 1-p. 6.

*Primary Examiner* — Douglas Q Tran
(74) *Attorney, Agent, or Firm* — JCIPRNET

(57) ABSTRACT

An information processing apparatus includes an acceptance unit that accepts an input of setting change information of the information processing apparatus, a setting change unit that changes a setting of the information processing apparatus by using the setting change information accepted by the acceptance unit, and a transmission unit that transmits the setting change information accepted by the acceptance unit to other apparatuses through BLE communication which is a communication method in which it is not necessary to specify a communication partner in advance.

10 Claims, 21 Drawing Sheets

(56) References Cited

U.S. PATENT DOCUMENTS

2019/0026067 A1* 1/2019 Baek ..................... G06F 3/165
2020/0280198 A1* 9/2020 Kwon .................. H04B 5/0081

FOREIGN PATENT DOCUMENTS

| JP | 2017085379 | 5/2017 |
| JP | 2017167661 | 9/2017 |

* cited by examiner

FIG. 15
PROCEDURE EXAMPLE 7
FOR SETTING IP ADDRESS
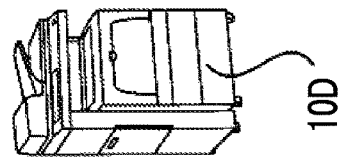
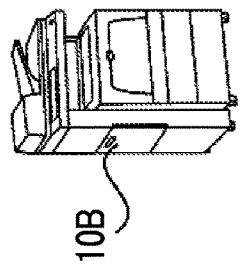
10B
(IP ADDRESS: 10. 0. 0. 1)
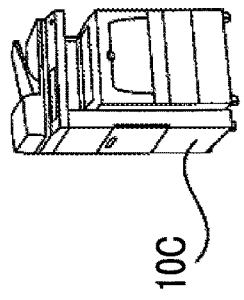
10C
(IP ADDRESS: 10. 0. 0. 2)
10D
(IP ADDRESS: 10. 0. 0. 3)
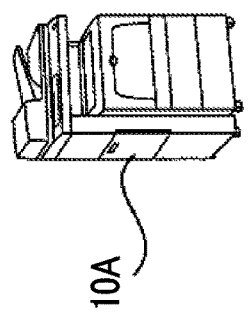
10A
(IP ADDRESS: 10. 0. 0. 0)

INFORMATION PROCESSING APPARATUS

CROSS-REFERENCE TO RELATED APPLICATIONS

This application is based on and claims priority under 35 USC 119 from Japanese Patent Application No. 2018-022709 filed Feb. 13, 2018.

BACKGROUND

(i) Technical Field

The present invention relates to an information processing apparatus capable of changing settings of plural apparatuses of which settings are to be changed even though information items regarding the apparatuses of which the settings are to be changed are not retained in advance.

(ii) Related Art

JP2012-008702A discloses a system in which in a case where a device control apparatus changes settings of plural network devices, one network device among the plural network devices collects setting information items of the other network devices, transmits the collected setting information items to the device control apparatus, and reflects the setting information items edited in the device control apparatus on the other network devices from the one network device.

JP2017-079450A discloses a batch setting system in which a mobile terminal apparatus remotely operates one apparatus as a target apparatus among plural image processing apparatuses and sets an identical value for the plural image processing apparatuses set so as to cooperate with the target apparatus.

JP2017-085379A discloses an information processing system in which a mobile terminal is wirelessly connected to an information processing apparatus through a wireless LAN method and setting data is transmitted to the information processing apparatus through wireless LAN communication in a case where a wireless connection is established.

SUMMARY

Aspects of non-limiting embodiments of the present disclosure relate to an information processing apparatus capable of changing settings of plural apparatuses of which settings are to be changed even though information items regarding the apparatuses of which the settings are to be changed are not retained in advance.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including an acceptance unit that accepts an input of setting change information of the information processing apparatus, a setting change unit that changes a setting of the information processing apparatus by using the setting change information accepted by the acceptance unit, and a transmission unit that transmits the setting change information accepted by the acceptance unit to other apparatuses through BLE communication which is a communication method in which it is not necessary to specify a communication partner in advance.

BRIEF DESCRIPTION OF THE DRAWINGS

Exemplary embodiment(s) of the present invention will be described in detail based on the following figures, wherein:

FIG. 15 is a diagram for describing a procedure example for setting the IP address;

DETAILED DESCRIPTION

Hereinafter, exemplary embodiments of the present invention will be described in detail with reference to the drawings.

First Exemplary Embodiment

Figure 1:
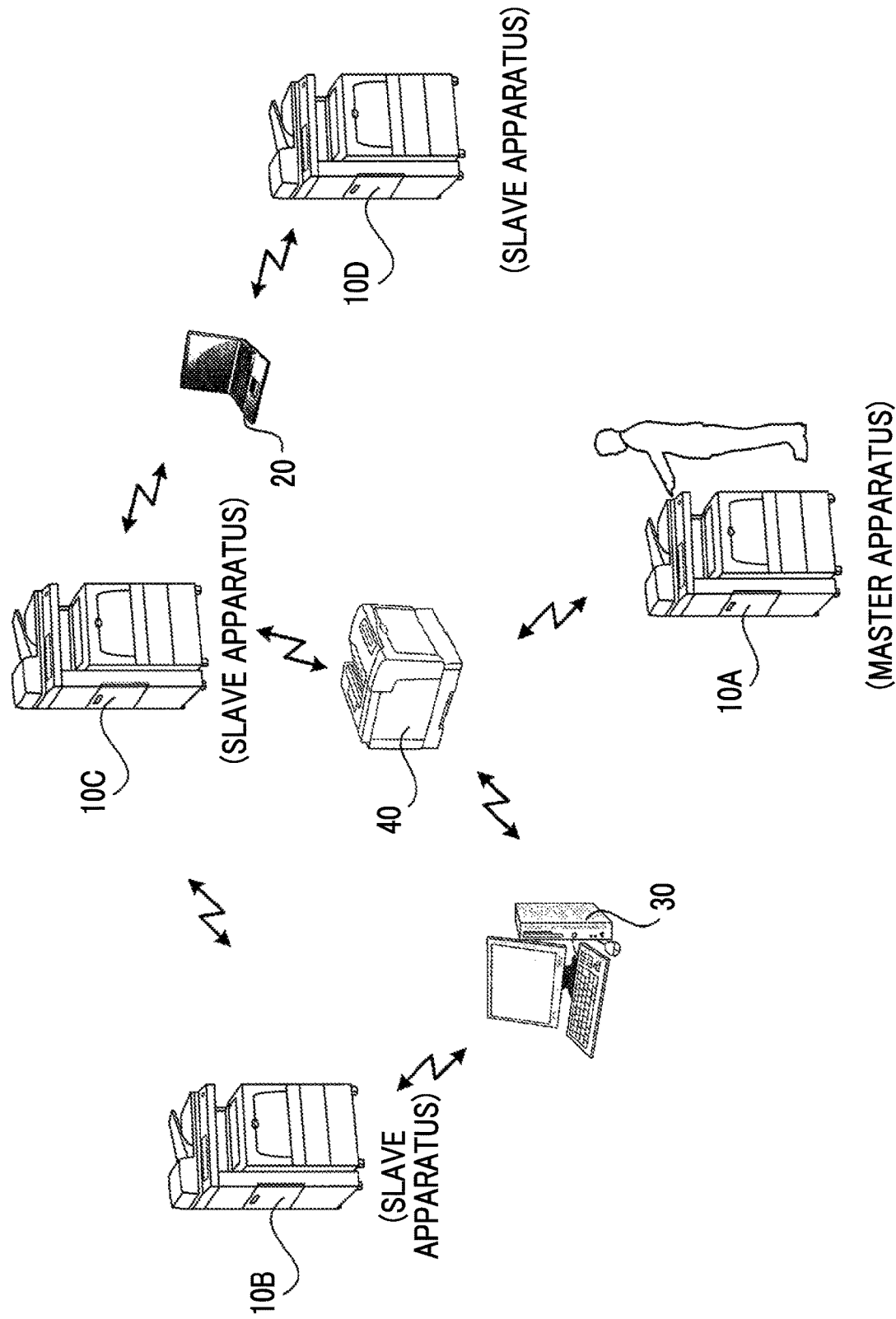
FIG. 1 is a diagram showing a system configuration of an information processing system according to a first exemplary embodiment of the present invention.

FIG. 1 is a diagram showing a system configuration of an information processing system according to a first exemplary embodiment of the present invention.

As shown in FIG. 1, in the information processing system according to the first exemplary embodiment of the present invention, plural image forming apparatuses 10A to 10D, terminal apparatuses 20 and 30 such as personal computers, and a printer 40 are connected with one another through Bluetooth Low Energy (BLE) communication which is a communication mode with low power consumption in Bluetooth (registered trademark) which is a short-range wireless communication standard.

Here, the image forming apparatuses 10A to 10D are apparatuses referred to as so-called multi-function printers having plural functions such as a print function, a scan function, a copy function, and a facsimile function.

In the information processing system shown in FIG. 1, the plural image forming apparatuses 10A to 10D, the terminal apparatuses 20 and 30, and the printer 40 are connected with one another through the BLE communication, and thus, a mesh network is constructed.

The mesh network technology is a technology that routes data between plural nodes, and the mesh network is constructed such that data is transmitted between the nodes by using another path even in a case where a part of a path is not available due to the occurrence of a failure such as malfunction in a part of the nodes.

It is not necessary to retain information items regarding other apparatuses to cooperate with in these apparatuses in order to construct such a mesh network. A certain apparatus having a BLE communication function is merely moved in a range in which the certain apparatus can perform the BLE communication with any of the apparatuses constituting the mesh network, and thus, the certain apparatus is also included in the mesh network. As a result, the certain apparatus and the other apparatuses constitute the mesh network.

That is, the information processing system according to an aspect of the present invention is constituted by plural apparatuses such as the plural image forming apparatuses 10A to 10D, the terminal apparatuses 20 and 30, and the printer 40 which are connected with one another via the mesh network using the BLE communication which is a communication method in which it is not necessary to specify a communication partner in advance.

As the BLE communication, there are a communication method using an advertising function and a communication method using a profile such as Generic Attribute (GATT).

These communication methods are communication methods in which it is not necessary to specify the communication partner in advance. However, the communication method using the advertising function is a communication method in which a certain apparatus merely transmits data to a surrounding apparatus as in a beacon communication without specifying which apparatus receives data transmitted from the certain apparatus. By contrast, the communication method using the profile such as GATT is a communication method in which a certain apparatus checks the presence of another apparatus present in a surrounding region, obtains the profile of the other apparatus, and transmits and receives data to and from the other apparatus from which the profile is obtained in a one-to-one correspondence.

As stated above, in the BLE communication using the advertising function, since the certain apparatus merely transmits the data received from the surrounding apparatus irrespective of the presence of the other apparatus, processing is simple. By contrast, in the communication method using the profile such as GATT, since the certain apparatus checks the presence of the other apparatus and communicates with the other apparatus, processing is complicated. It is possible to perform the transmission and reception of data with a certain amount of data in the communication method using the profile such as GATT, but the amount of data capable of being transmitted and received becomes small in the BLE communication using the advertising function.

In the following description, a case where settings are changed in the information processing system according to the present exemplary embodiment in such a manner that a user changes the setting by directly operating an image forming apparatus 10A as a master apparatus among image forming apparatuses 10A to 10D as apparatuses of which settings are to be changed and transmits the setting content as setting change information to the image forming apparatuses 10B to 10D as slave apparatuses will be described.

For example, a case where various settings such as an initial setting of resolution at the time of performing processing for reading an image, a time setting for changing a mode to a power saving mode, and a density setting at the time of printing are performed for the image forming apparatuses 10A to 10D with identical setting contents will be described.

All the image forming apparatuses 10A to 10D have the same configuration, and all the apparatuses may be the master apparatus or the slave apparatus.

Figure 2:
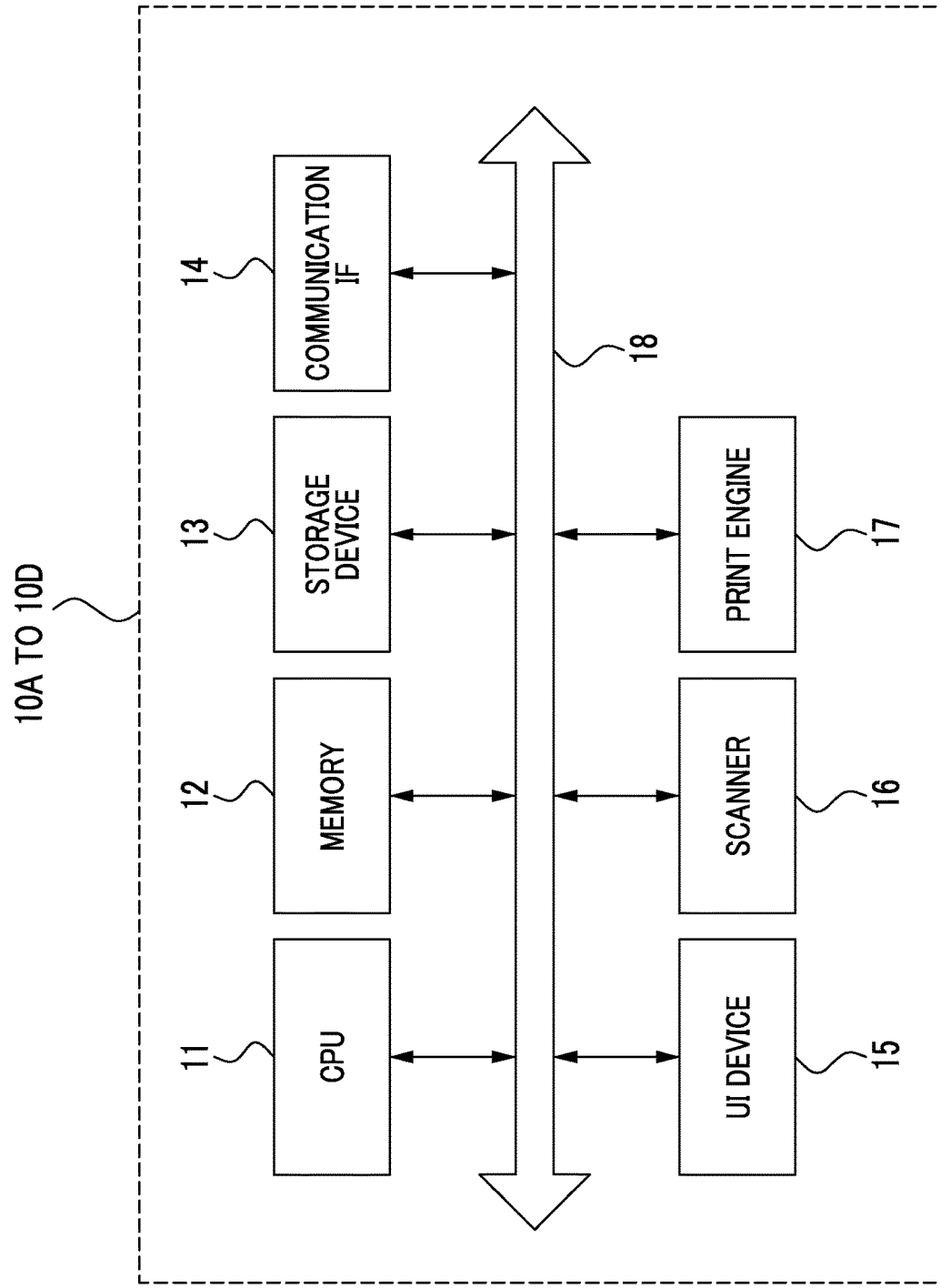
FIG. 2 is a block diagram showing a hardware configuration of each of image forming apparatuses 10A to 10D according to the first exemplary embodiment of the present invention.

Hereinafter, a hardware configuration of each of the image forming apparatuses 10A to 10D according to the present exemplary embodiment is shown in FIG. 2.

As shown in FIG. 2, each of the image forming apparatuses 10A to 10D includes a CPU 11, a memory 12, a storage device 13 such as a hard disk drive (HDD), a communication interface (IF) 14 that transmits and receives data to and from an external apparatus, a user interface (UI) device 15 including a touch panel or a liquid crystal display and a keyboard, a scanner 16, and a print engine 17. These components are connected with one another through a control bus 18.

The print engine 17 prints an image on a recording medium such as printing paper through charging, exposing, developing, transferring, and fixing steps.

The CPU 11 controls the operation of each of the image forming apparatuses 10A to 10D by performing predetermined processing based on a control program stored in the memory 12 or the storage device 13. Although it has been described in the present exemplary embodiment that the CPU 11 reads the control program stored in the memory 12 or the storage device 13 and executes the read control program, the program may be provided to the CPU 11 while being stored in a storage medium such as a CD-ROM.

Figure 3:
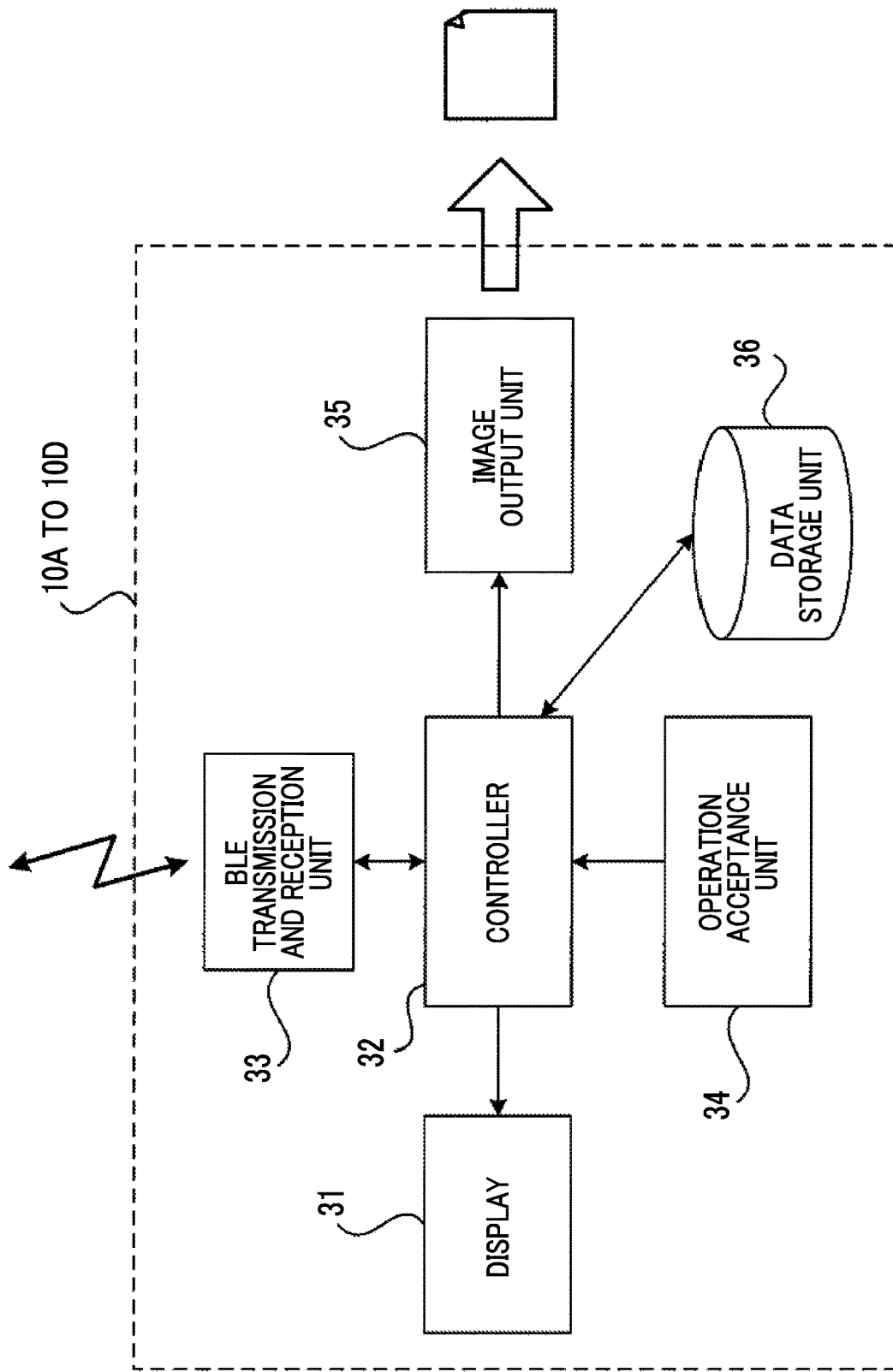
FIG. 3 is a block diagram showing a functional configuration of each of the image forming apparatuses 10A to 10D according to the first exemplary embodiment of the present invention.

FIG. 3 is a block diagram showing a functional configuration of each of the image forming apparatuses 10A to 10D realized by executing the control program. In the block diagram shown in FIG. 3, various functions such as an image reading function which are not directly related to the operations in the present exemplary embodiment will be omitted.

As shown in FIG. 3, each of the image forming apparatuses 10A to 10D according to the present exemplary embodiment includes a display 31, a controller 32, a BLE transmission and reception unit 33, an operation acceptance unit 34, an image output unit 35, and a data storage unit 36.

The image output unit 35 outputs an image on a recording medium such as printing paper based on the control of the controller 32.

The controller 32 performs printing by controlling the image output unit 35 based on an instruction from the user.

The display 31 displays various information items to the user under the control of the controller 32. The operation acceptance unit 34 accepts various operation information items performed by the user. The display 31 and the operation acceptance unit 34 constitute an operation panel of a so-called touch panel type.

The BLE transmission and reception unit 33 transmits and receives data with other apparatuses through the aforementioned BLE communication.

The data storage unit 36 stores various data items such as various setting information items in a case where the controller 32 controls the image output unit 35.

In the following description, the operations of the aforementioned components will be described while distinguishing between a case where each of the image forming apparatuses 10A to 10D is operated as the master apparatus and a case where each of the image forming apparatuses is operated as the slave apparatus.

Initially, a case where each of the image forming apparatuses 10A to 10D accepts an instruction to change the settings from the user and operates as the master apparatus that transmits the accepted setting change contents to other apparatuses will be described.

In this case, the operation acceptance unit 34 accepts an input of the setting change information for changing the setting of the apparatus in response to the operation from the user. The controller 32 changes the setting of the host apparatus by using the setting change information accepted by the operation acceptance unit 34. For example, the controller changes various settings such as a storage location of image data read by the scanner, resolution at the time of reading an image, density at the time of printing an image by the image output unit 35, print quality, black and white/color setting, and double-sided/single-sided printing.

The BLE transmission and reception unit 33 transmits the setting change information accepted by the operation acceptance unit 34 to the other apparatuses through the BLE communication which is the communication method in which it is not necessary to specify the communication partner in advance. For example, the BLE transmission and reception unit 33 transmits the setting change information to the other apparatuses by using the advertising function of the BLE communication.

In a case where the setting change information includes plural setting change items, the BLE transmission and reception unit 33 sequentially transmits the setting change information to the other apparatuses for each setting change item.

The BLE transmission and reception unit 33 receives the information items transmitted from the other apparatuses through the BLE communication. The BLE transmission and reception unit 33 receives setting change completion notifications from the other apparatuses, and then transmits the setting change information of the next setting change item to the other apparatuses.

Alternatively, in a case where a predetermined time elapses, the BLE transmission and reception unit 33 may transmit the setting change information of the next setting change item to the other apparatuses.

The BLE transmission and reception unit 33 may transmit the setting change information to the other apparatuses after the controller 32 completes the setting changes of the host apparatus, or may transmit the setting change information to the other apparatuses irrespective of whether the controller 32 completes the setting change of the host apparatus.

The BLE transmission and reception unit 33 transmits the setting change information to the other apparatuses, and then transmits a setting change completion notification.

In a case where the setting change using the setting change information accepted by the operation acceptance unit 34 is the setting change that requires rebooting in order to enable the changed setting content, the BLE transmission and reception unit 33 transmits information indicating that the rebooting is to be performed before the host apparatus reboots.

The BLE transmission and reception unit 33 may transmit the information indicating that the rebooting is to be performed to the other apparatuses after all the setting changes of the host apparatus are ended.

Hereinafter, a case where each of the image forming apparatuses 10A to 10D operates as the slave apparatus that receives the setting change information items transmitted from the master apparatus or another apparatus, changes the setting contents of the host apparatus based on the received setting change information items, and transmits the received setting change information items to another apparatus will be described.

In this case, the BLE transmission and reception unit 33 receives the setting change information items from another apparatus through the BLE communication which is the communication method in which it is not necessary to specify the communication partner in advance. By doing this, the controller 32 changes the settings of the host apparatus by using the setting change information items received by the BLE transmission and reception unit 33. The BLE transmission and reception unit 33 transmits the received setting change information items to other apparatuses through the BLE communication.

Here, in a case where the setting change information items are transmitted and received through the BLE communication using the advertising function, the BLE transmission and reception unit 33 does not recognize whether or not the another apparatus from which the setting change information items are received and the another apparatus to which the setting change information items are transmitted are identical. That is, the BLE transmission and reception unit 33 merely retransmits the received setting change information items, and does not perform the transmission and reception of data while recognizing the communication partner.

The controller 32 changes the settings of the host apparatus by using only the setting contents changeable in the host apparatus among the setting change contents indicated by the setting change information items received by the BLE transmission and reception unit 33.

The controller 32 may change the setting contents of the host apparatus based on the received setting change information items only in a case where a certain condition is satisfied instead of changing the setting contents of the host apparatus based on the constantly received setting change information items in a case where the setting change information items are received.

For example, the settings may be registered for each of the image forming apparatuses 10A to 10D in advance such that (1) the settings are changed based on all the received setting change information items, (2) the settings are not changed based on the received setting change information items, (3) the settings are changed based on the received setting information change items only in a case where the received setting change information items are addressed to a group to which the host apparatus belongs, and (4) the settings are changed based on only the setting change information items transmitted from a particular apparatus.

Specifically, a selection result of whether or not to accept the setting change using the setting change information from the another apparatus may be registered in the data storage unit 36 in advance, and the controller 32 may change the setting of the host apparatus by using the setting change information received by the BLE transmission and reception unit 33 in a case where the selection result indicating that the setting change using the setting change information from the another apparatus is accepted is registered.

Attribute information for determining whether or not to accept the setting change using the setting change information from the another apparatus may be registered in the data storage unit 36 in advance, and the controller 32 may change the setting of the host apparatus by using the setting change information received by the BLE transmission and reception unit 33 in a case where the attribute information registered in the data storage unit 36 matches attribute information included in the setting change information received by the BLE transmission and reception unit 33.

In a case where identification information for identifying each apparatus, for example, an Internet Protocol (IP) address is included in the received setting change information, the BLE transmission and reception unit 33 transmits the received setting change information to another apparatus in a state in which the identification information is changed.

Specifically, in a case where the IP address is included in the setting change information received by the BLE transmission and reception unit 33, the controller 32 increments the IP address. The BLE transmission and reception unit 33 transmits the setting change information including the IP address incremented by the controller 32 to another apparatus.

Since it is necessary to prevent the identification information such as IP address from being set so as to be duplicated in each apparatus, in a case where the setting of the host apparatus is changed by the IP address included in the received setting change information, the BLE transmission and reception unit 33 transmits timing information when the setting of the IP address is changed in the host apparatus in association with the changed IP address to the another apparatus through the BLE communication.

In a case where timing information in association with identification information set in the host apparatus is received by the BLE transmission and reception unit 33 and the received timing information is earlier than timing information when the IP address is set in the host apparatus, the controller 32 deletes the set IP address.

The BLE transmission and reception unit 33 may transmit the setting change information to the another apparatus after the controller 32 completes the setting change of the host apparatus, or may transmit the setting change completion notification after the setting change information is transmitted to the another apparatus.

In a case where the information indicating that the rebooting is to be performed is accepted by the operation acceptance unit 34 and the setting change performed by the controller is the setting change that requires the rebooting in order to enable the changed setting content, the controller 32 performs the rebooting.

In a case where the information indicating that the rebooting is to be performed is received, the BLE transmission and reception unit 33 transmits the information indicating that the rebooting is to be performed to the another apparatus through the BLE communication.

Hereinafter, the operation of the information processing system according to the present exemplary embodiment will be described in detail with reference to the drawings.

In the following description, a case where the user performs various settings for the image forming apparatus 10A as the master apparatus by directly operating the master apparatus and sets the setting contents for the image forming apparatuses 10B to 10D will be described.

Figure 4:
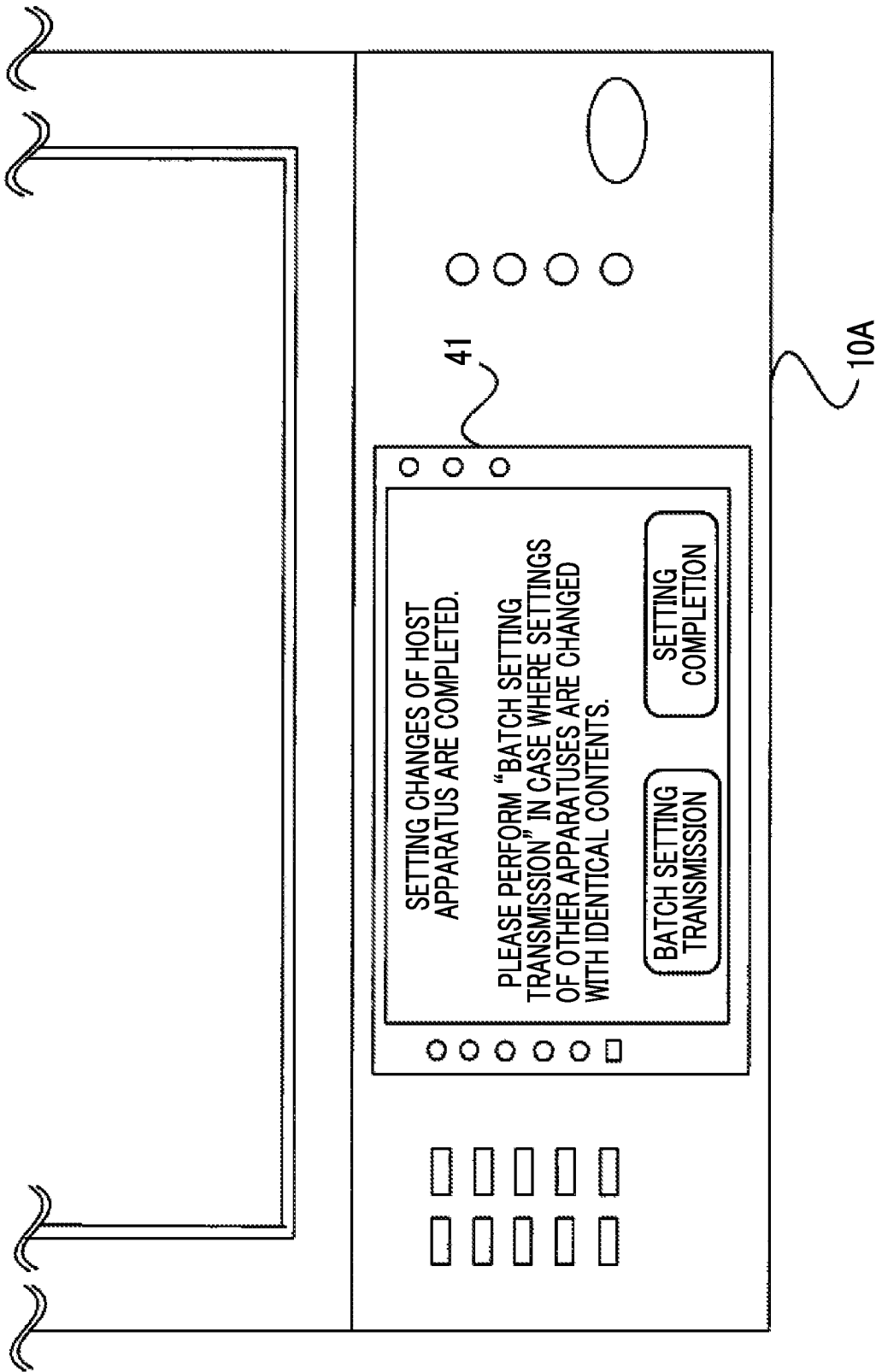
FIG. 4 is a diagram showing a display screen example displayed on an operation panel 41 in a case where a user completes changing of setting contents for the image forming apparatus 10A.

For example, in a case where the user completes the changing of the setting contents for the image forming apparatus 10A, the display contents shown in FIG. 4 are displayed on an operation panel 41.

Here, in a case where the user operates a "batch setting transmission" button on the operation panel 41, the setting change information items for changing the setting contents are transmitted from the image forming apparatus 10A through the BLE communication. In a case where the user operates a "setting completion" button on the operation panel 41 shown in FIG. 4, the user completes the changing of the setting contents without transmitting the setting change information items to the another apparatus.

The setting change information items transmitted from the image forming apparatus 10A are transmitted to the image forming apparatus 10B to 10D through the apparatuses such as the terminal apparatuses 20 and 30 or the printer 40. The setting contents in each of the image forming apparatuses 10B to 10D are changed based on the received setting change information items.

In a case where processing for changing the settings in each host apparatus is completed, each of the image forming apparatuses 10B to 10D transmits the setting change completion notification for notifying that the setting changes are completed through the BLE communication.

Figure 5:
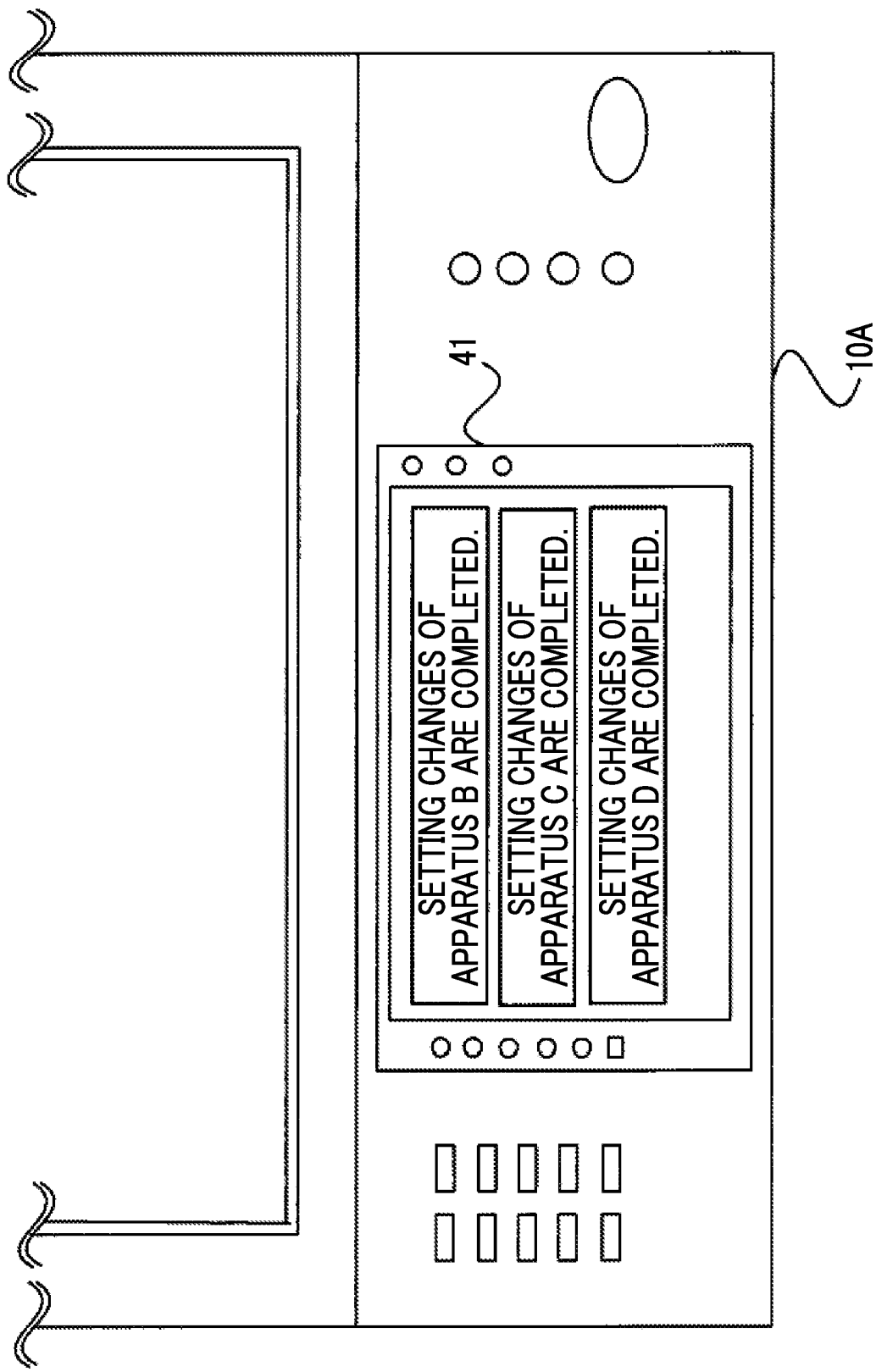
FIG. 5 is a diagram showing a display screen example displayed on the operation panel 41 in a case where the image forming apparatus 10A receives setting change completion notifications from the image forming apparatuses 10B to 10D.

By doing this, the image forming apparatus 10A receives the setting change completion notifications transmitted by the image forming apparatuses 10B to 10D through the apparatuses such as the terminal apparatuses 20 and 30 or the printer 40. The image forming apparatus 10A recognizes that the setting changes in the image forming apparatuses 10B to 10D are uneventfully completed by receiving the setting change completion notifications, and displays information indicating that the setting changes are completed on the operation panel 41 as shown in FIG. 5. In the display example shown in FIG. 5, the information indicating that the setting changes in the apparatuses B to D (the image forming apparatuses 10B to 10D) are completed is displayed on the operation panel 41.

The user can recognize that the setting change contents performed in the image forming apparatus 10A are also reflected on the image forming apparatuses 10B to 10D by referring to such information.

For example, the processing for changing the settings according to the present exemplary embodiment may be performed in various situations in addition to a case where the user changes the settings of the plural image forming apparatuses 10A to 10D with the same contents in the office of the user who sets and uses the plural image forming apparatuses 10A to 10D, as shown in FIG. 1.

Figure 6:
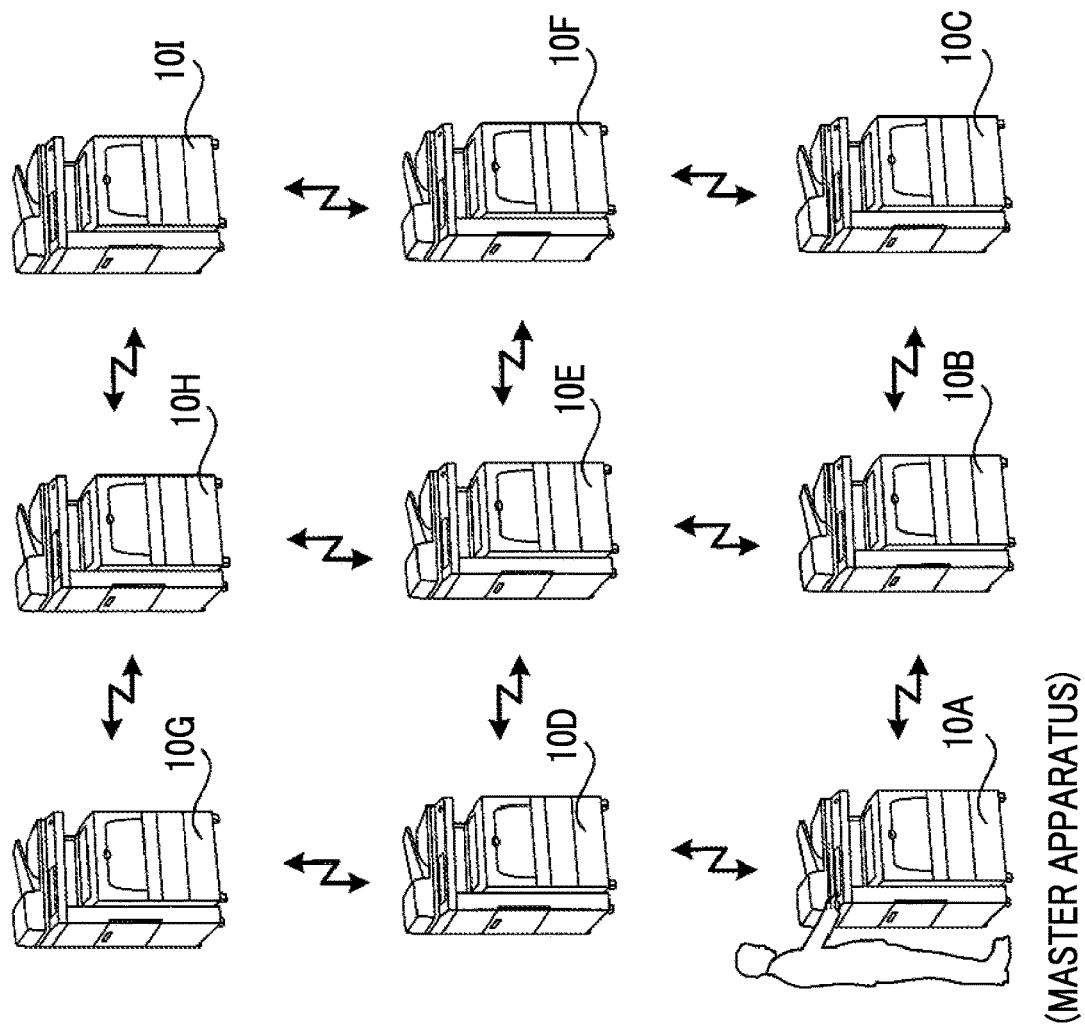
FIG. 6 is a diagram for describing an example in which settings of plural image forming apparatuses 10A to 10I disposed in a warehouse or a factory which are not shipped yet are performed with identical contents.

For example, the settings may be changed by the aforementioned method in a case where the settings of plural image forming apparatuses 10A to 10I disposed within a warehouse or a factory which are not shipped yet are changed with the identical contents, as shown in FIG. 6. In this case, the user can change the settings of the image forming apparatuses 10B to 10I with the same contents by changing the settings of one image forming apparatus 10A which is selected as the master apparatus among the plural image forming apparatuses 10A to 10I and giving an instruction to transmit the setting change contents to the other apparatuses.

However, there are some cases where the setting changes may be desired to be reflected on only a part of the apparatuses instead of changing the settings of the plural image forming apparatuses 10A to 10I with the same contents. For example, there are a case where setting changes are desired to be performed for only a particular apparatus such as a case where the setting changes are desired to be performed for only an apparatus of a certain model name or a case where different setting changes are desired to be performed for users to which apparatuses are to be delivered.

In such a case, attribute information such as group information is registered for the image forming apparatus in advance, and the group information for which the setting changes are to be performed is also included in the transmitted setting change information. The apparatus that receives the setting change information may perform the setting change based on the received setting change information only in a case where the attribute information registered in the host apparatus matches the attribute information included in the received setting change information.

Figure 7:
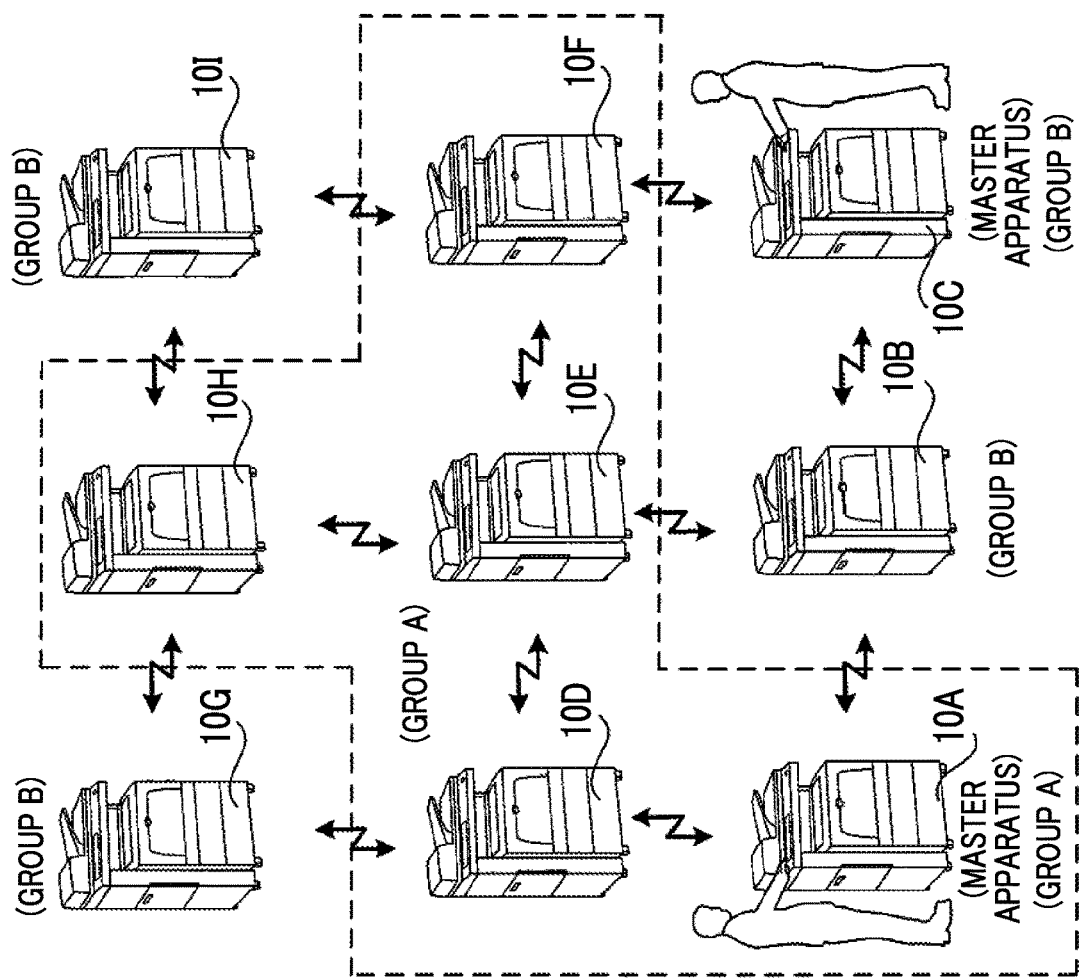
FIG. 7 is a diagram for describing an example in which the settings of the plural image forming apparatuses 10A to 10I disposed in the warehouse or the factory are changed with different contents for Groups A and B.

For example, attribute information of Group A is registered for the image forming apparatuses 10A, 10D to 10F, and 10H in advance, and attribute information of Group B is registered for the image forming apparatuses 10B, 10C, 10G, and 10I, as shown in FIG. 7.

For example, in a case where the settings of the image forming apparatuses 10A, 10D to 10F, and 10H belonging to Group A are desired to be changed in batches, the settings of one image forming apparatus 10A which is selected among these image forming apparatuses are changed, and the setting change information items are transmitted. For example, in a case where the settings of the image forming apparatuses 10B, 10C, 10G, and 10I belonging to Group B are desired to be performed in batches, the settings of one image forming apparatus 10C which is selected among these image forming apparatuses are changed, and the setting change information items are transmitted. By doing this, it is possible to perform different setting changes for different groups to which the apparatuses belong.

Figure 8:
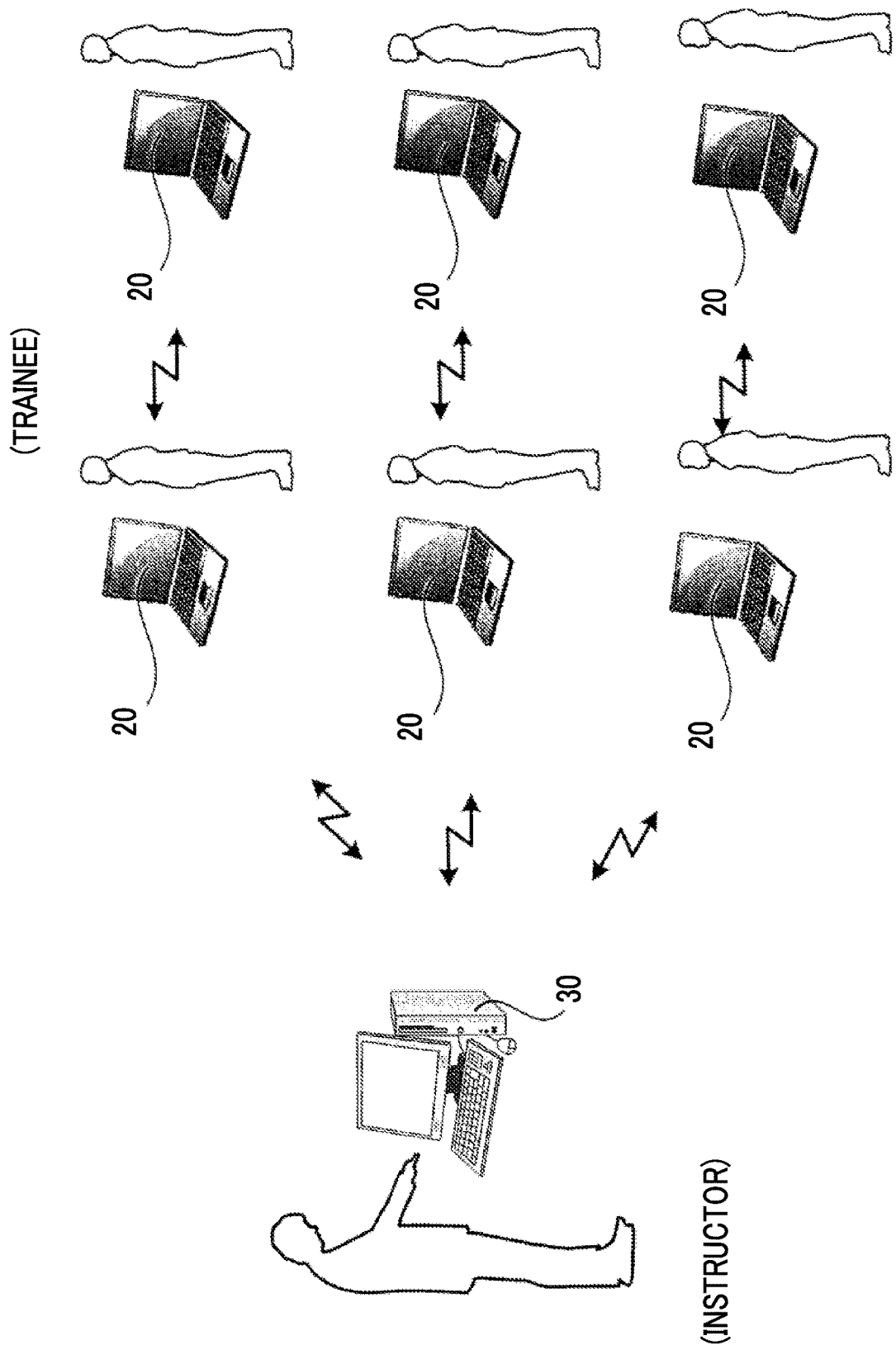
FIG. 8 is a diagram for describing a utilization form in a case where any training is performed by one instructor and plural trainees and settings of terminal apparatuses 20 used by the plural trainees are changed with identical contents in batches.

As another utilization form, in a case where any training is performed by one instructor and plural trainees as shown in FIG. 8, the settings of terminal apparatuses 20 used by the plural trainees may be changed with the same contents in batches.

In such a case, the settings are changed in such a manner that the setting change information items are transmitted from a terminal apparatus 30 of the instructor through the BLE communication and the setting change information items are received by the terminal apparatuses 20 of the trainees, and thus, the settings of the terminal apparatuses 20 of the plural trainees are changed with the same contents.

Although it has been described that the settings of the plural apparatuses are changed with the same contents, it is necessary to set different IP addresses for the apparatuses at the time of setting the identification information for specifying the apparatus such as the IP address.

In such a case, the apparatus that receives the setting change information from the another apparatus increments the IP address included in the received setting change information, and then transmits the setting change information to the other apparatuses. In order to prevent the identical IP address from being set so as to be duplicated in the plural apparatuses, the timing information when the setting of the IP address in the host apparatus is changed in association with the changed IP address is transmitted to the other apparatuses through the BLE communication. The apparatus receives the set IP address and the timing information when the IP address is set, and deletes the set IP address in a case where the received timing information is earlier than timing information when the IP address is set in the host apparatus.

An example in which the setting of the IP address is prevented so as to be duplicated by performing the processing for setting the IP address will be described with reference to FIGS. 9 to 15. Hereinafter, a case where the IP address is set for four image forming apparatuses such as the image forming apparatuses 10A to 10D will be described.

Figure 9:
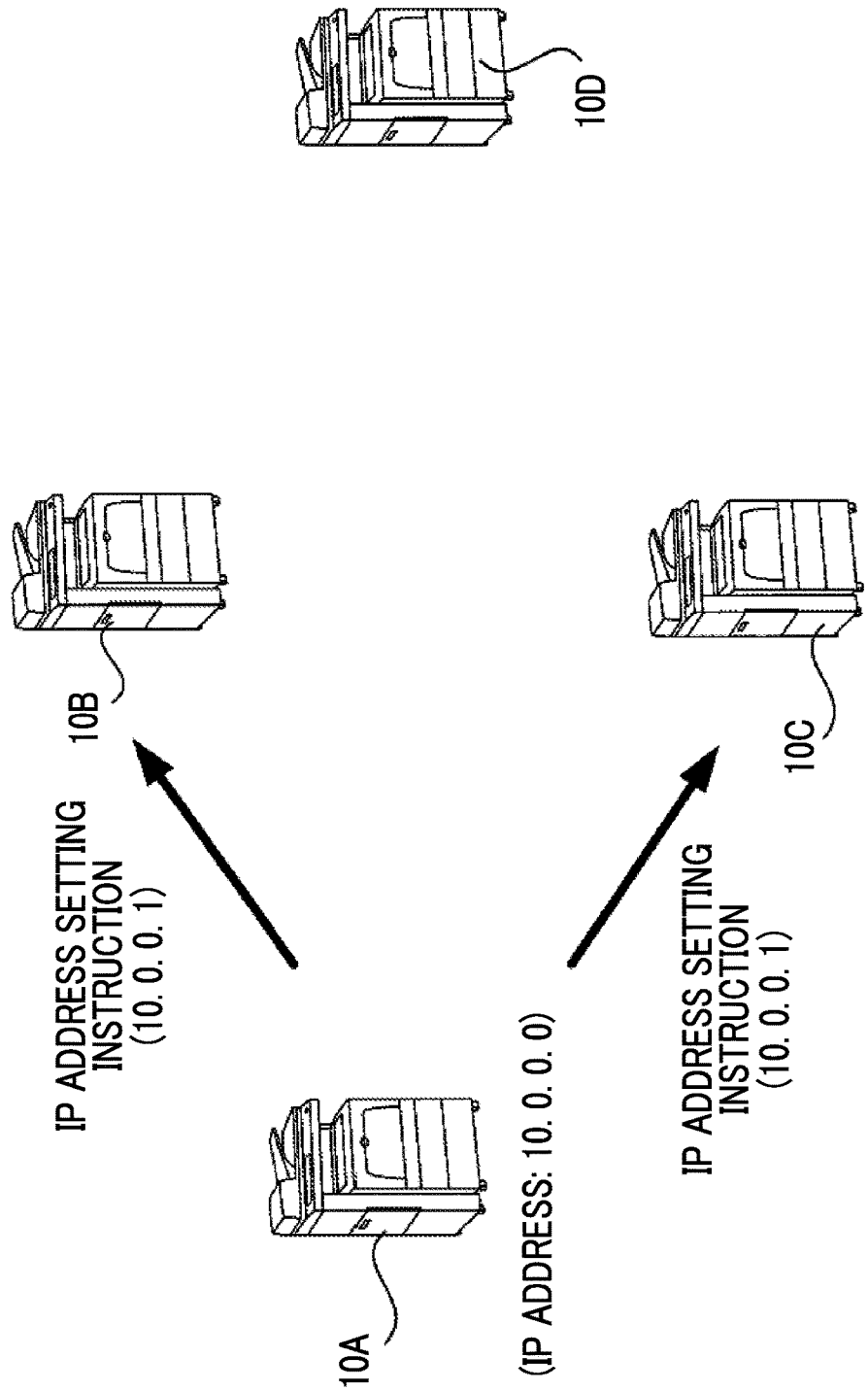
FIG. 9 is a diagram for describing a procedure example for setting an IP address.

Initially, a case where an IP address of 10.0.0.0 is set in the image forming apparatus 10A is described as shown in FIG. 9. By doing this, the image forming apparatus 10A increments the set IP address, and transmits an IP address setting instruction to set an IP address of 10.0.0.1 through the BLE communication. A case where the IP address setting instruction is received by two apparatuses such the image forming apparatuses 10B and 10C is described.

Figure 10:
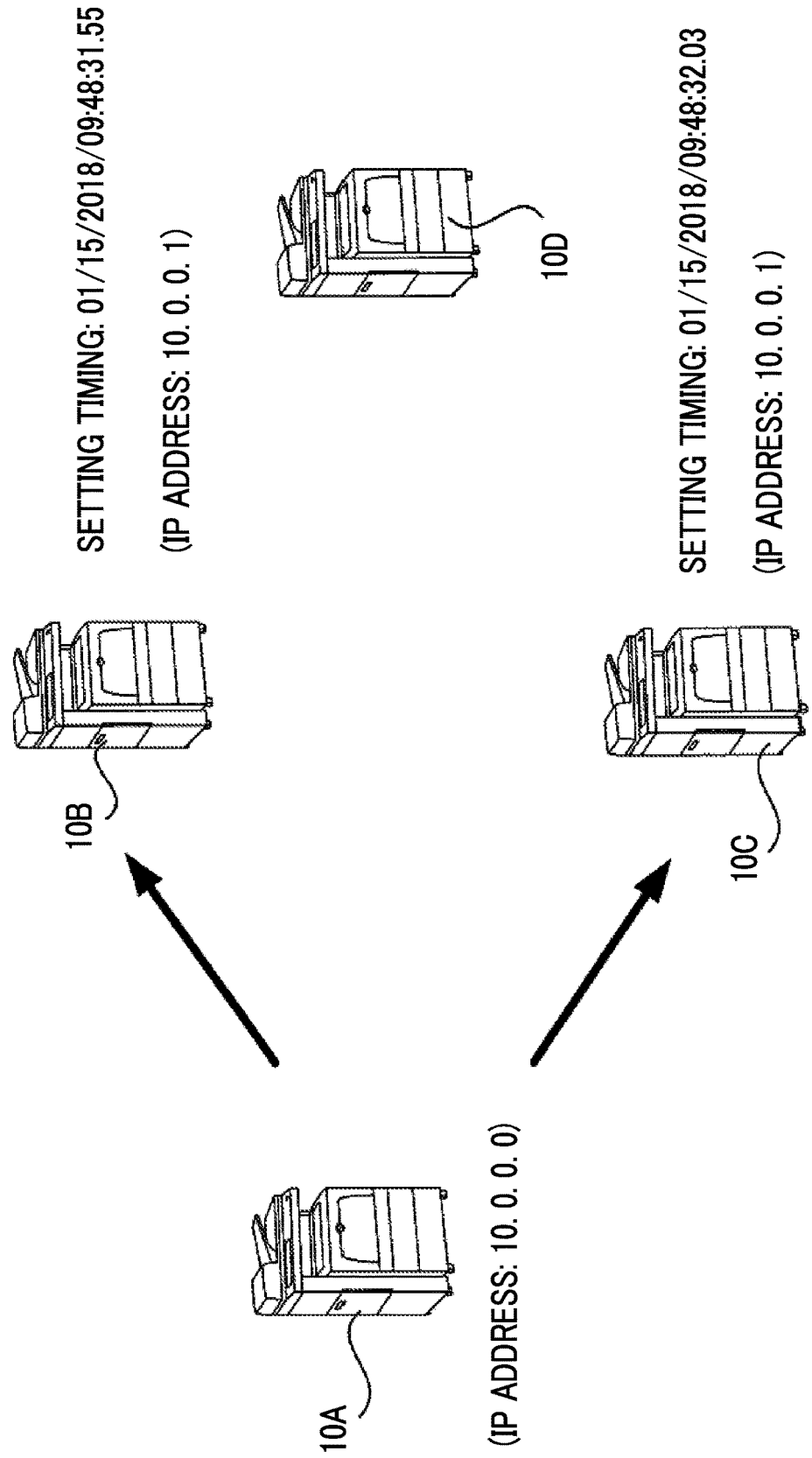
FIG. 10 is a diagram for describing a procedure example for setting the IP address.

By doing this, as shown in FIG. 10, the image forming apparatuses 10B and 10C set the IP address of 10.0.0.1 based on the received IP address setting instruction. Here, it is assumed that a setting timing is 2018/01/15/09:48:31.55 in the image forming apparatus 10B and a setting timing is 2018/01/15/09:48:32.03 in the image forming apparatus 10C.

Figure 11:
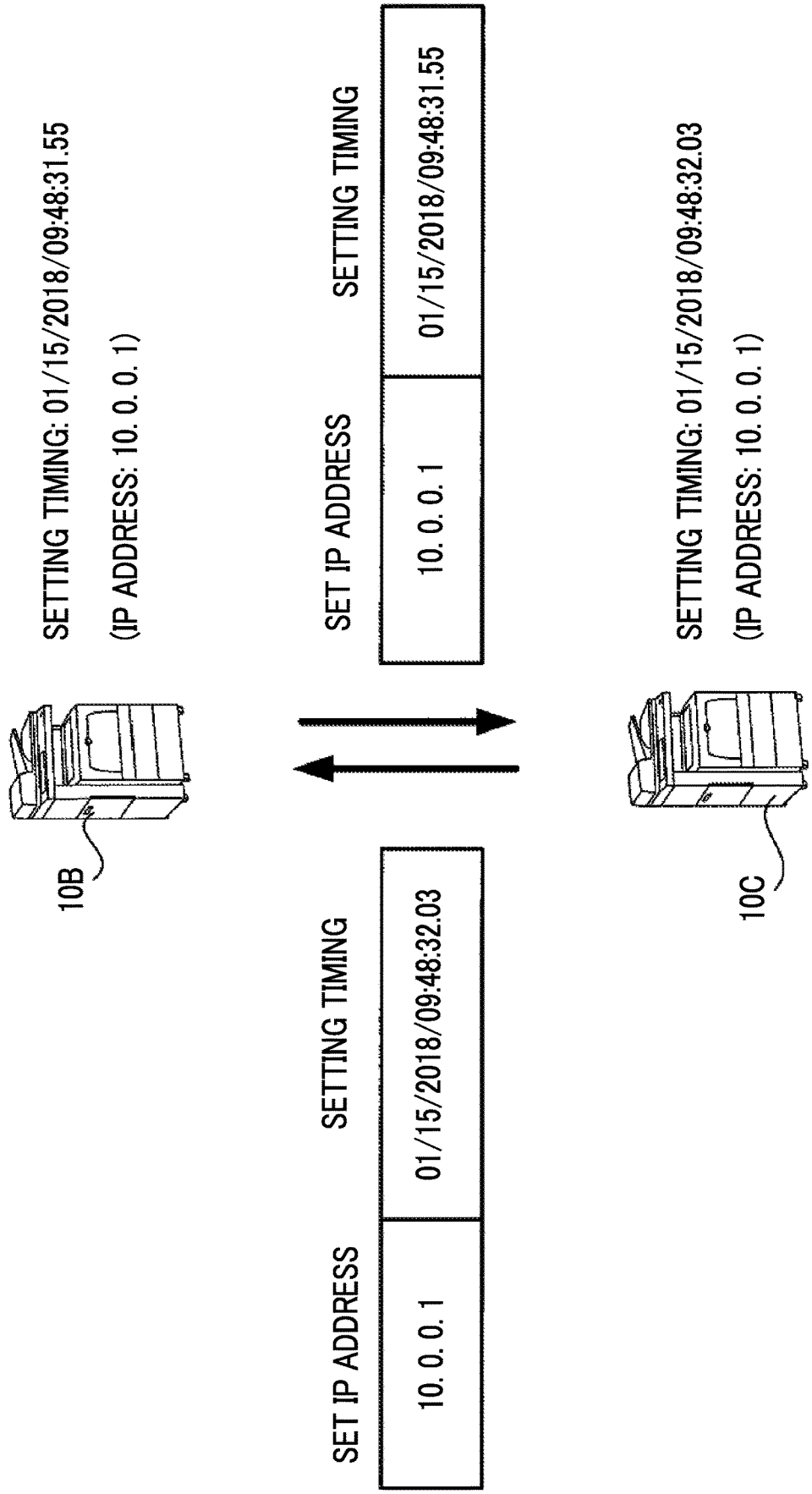
FIG. 11 is a diagram for describing a procedure example for setting the IP address.

In a case where the setting of the IP address is completed, each of the image forming apparatuses 10B and 10C transmits the set IP address in association with the setting timing information through the BLE communication, as shown in FIG. 11.

Figure 12:
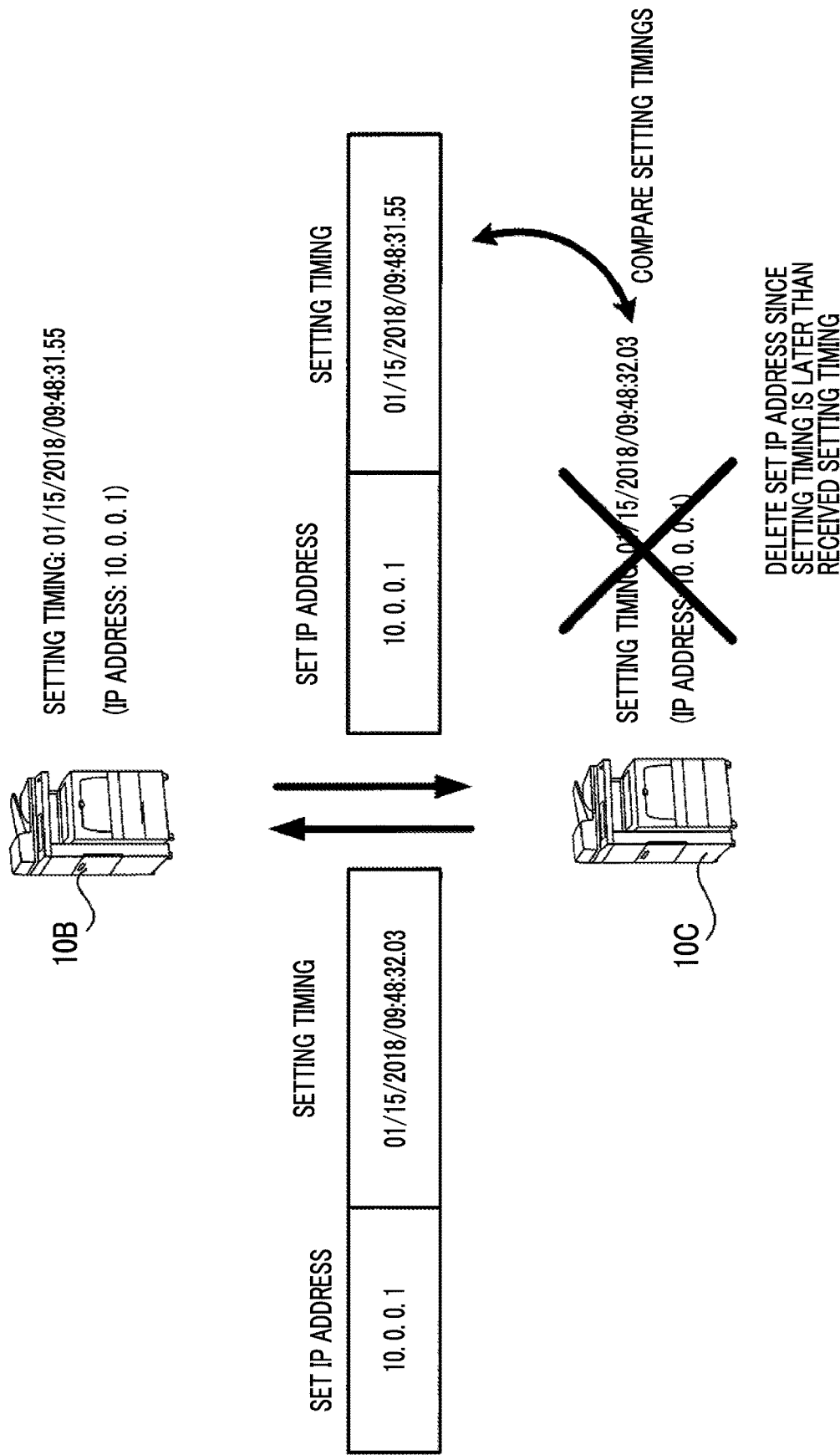
FIG. 12 is a diagram for describing a procedure example for setting the IP address.
Figure 13:
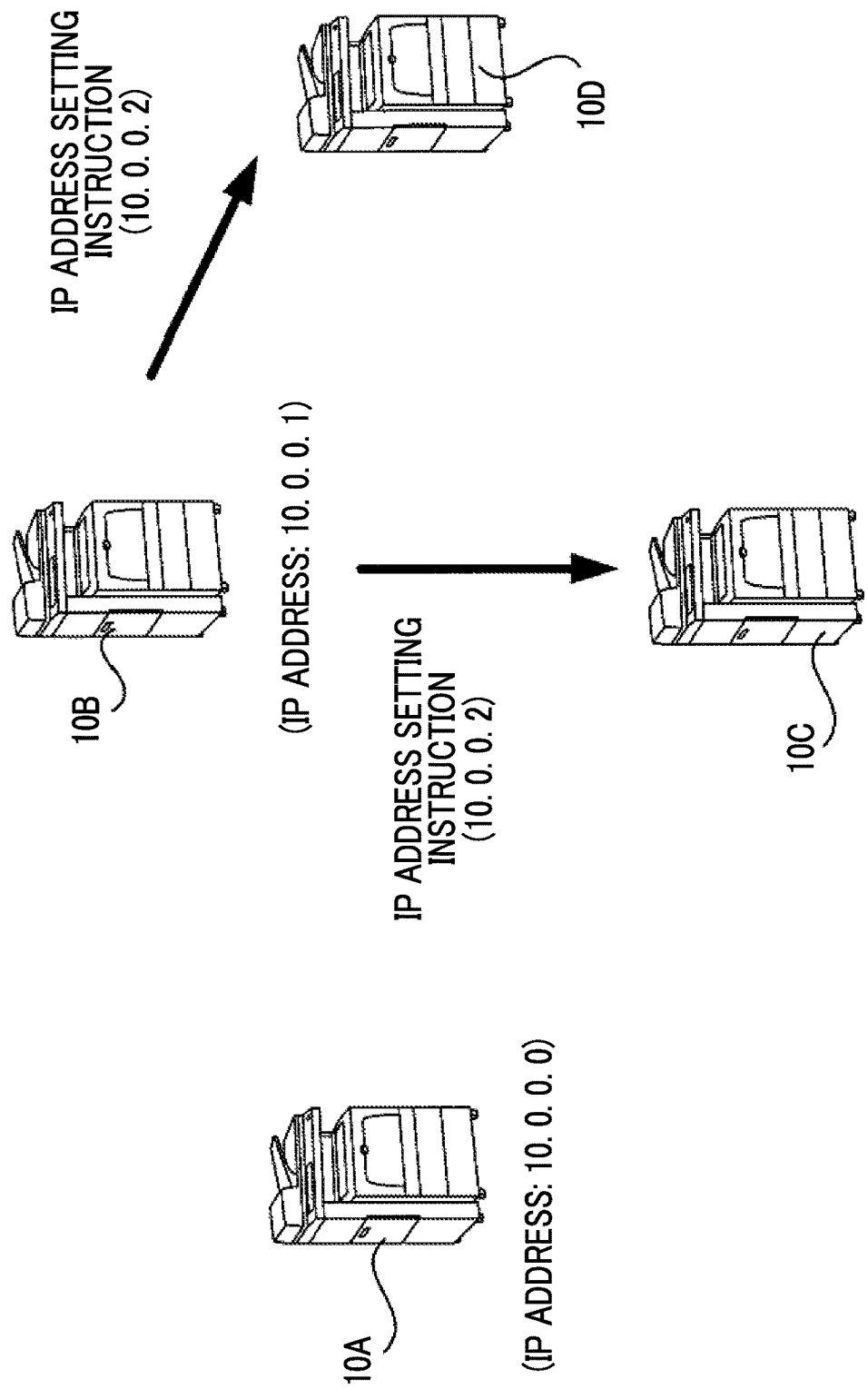
FIG. 13 is a diagram for describing a procedure example for setting the IP address.

By doing this, each of the image forming apparatuses 10B and 10C compares the setting timing when the IP address is set in the host apparatus with the received setting timing, as shown in FIG. 12. Here, since the setting timing in the host apparatus is later than the received setting timing, the image forming apparatus 10C performs processing for deleting the IP address of 10.0.0.1 set in the host apparatus.

Since the setting timing in the host apparatus is earlier than the received setting timing, the image forming apparatus 10B uses the IP address of 10.0.0.1 set in the host apparatus, increments the IP address set in the host apparatus, and transmits an IP address setting instruction to set an IP address of 10.0.0.2 through the BLE communication. A case where the IP address setting instruction is received by two apparatuses such as the image forming apparatuses 10C and 10D will be described.

Figure 14:
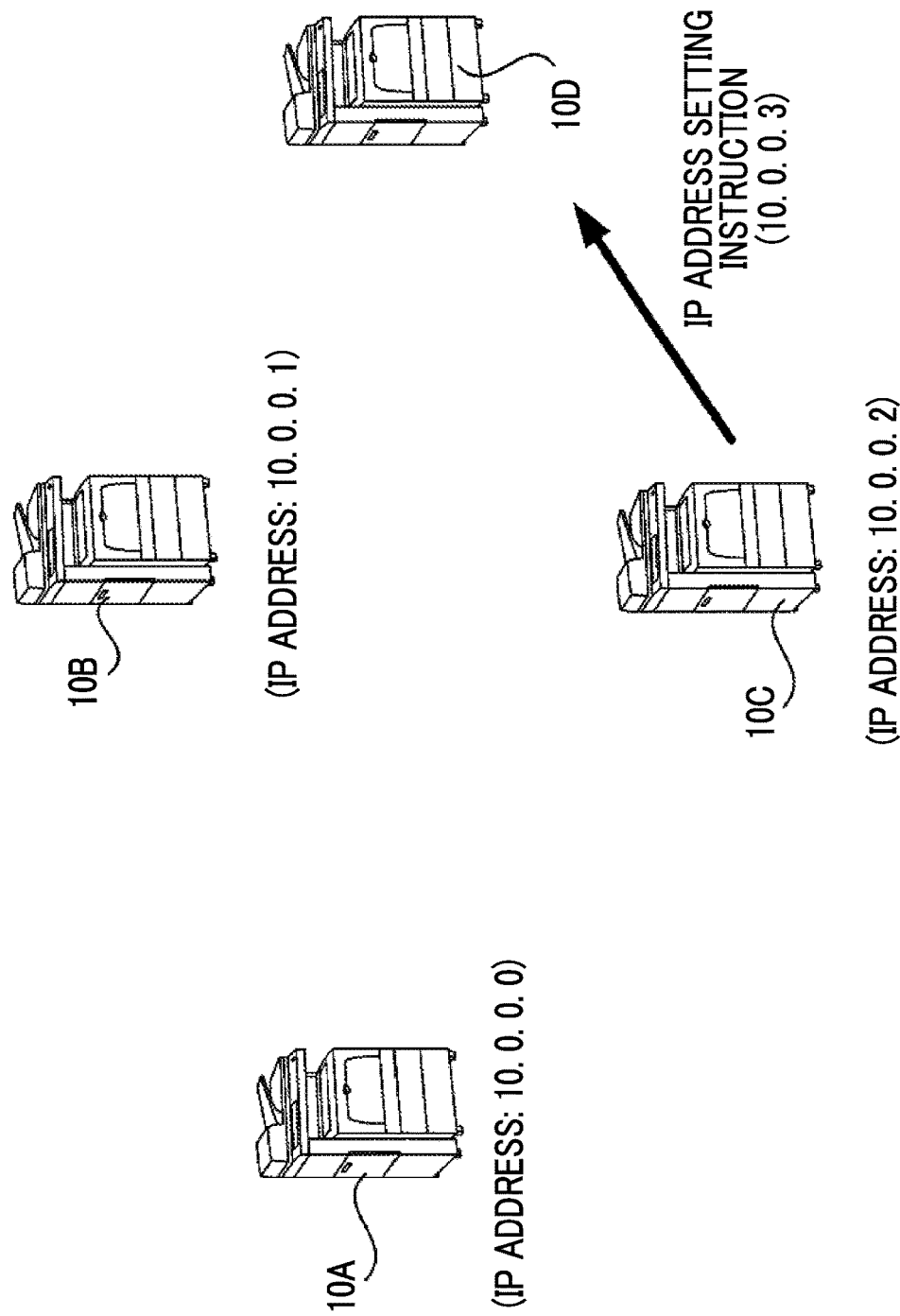
FIG. 14 is a diagram for describing a procedure example for setting the IP address.

Hereinafter, a case where the IP address is set in the image forming apparatus 10C in a setting timing earlier than that in the image forming apparatus 10D will be described. In this manner, the aforementioned processing is repeated, and thus, the IP address of 10.0.0.2 is set in the image forming apparatus 10C as shown in FIG. 14. The image forming apparatus 10C increments the IP address set in the host apparatus, and transmits an IP address setting instruction to set an IP address of 10.0.0.3 through the BLE communication. The IP address setting instruction is received by the image forming apparatus 10D.

The image forming apparatus 10D performs processing for setting the IP address of 10.0.0.3, as shown in FIG. 15. The aforementioned processing is performed, and thus, the image forming apparatuses 10A to 10D set different IP addresses of 10.0.0.0 to 10.0.0.3, respectively.

Second Exemplary Embodiment

Hereinafter, an information processing system according to a second exemplary embodiment of the present invention will be described.

It has been described in the information processing system according to the first exemplary embodiment that one apparatus is selected as the master apparatus among the plural apparatuses of which the settings are to be changed and the setting of the selected apparatus is changed. By contrast, in the information processing system according to the present exemplary embodiment, the setting change information items are transmitted from the apparatus such as the smartphone or the tablet terminal other than the apparatuses of which the settings are to be changed, and the settings of the plural target apparatuses of which the settings are to be changed are changed.

Figure 16:
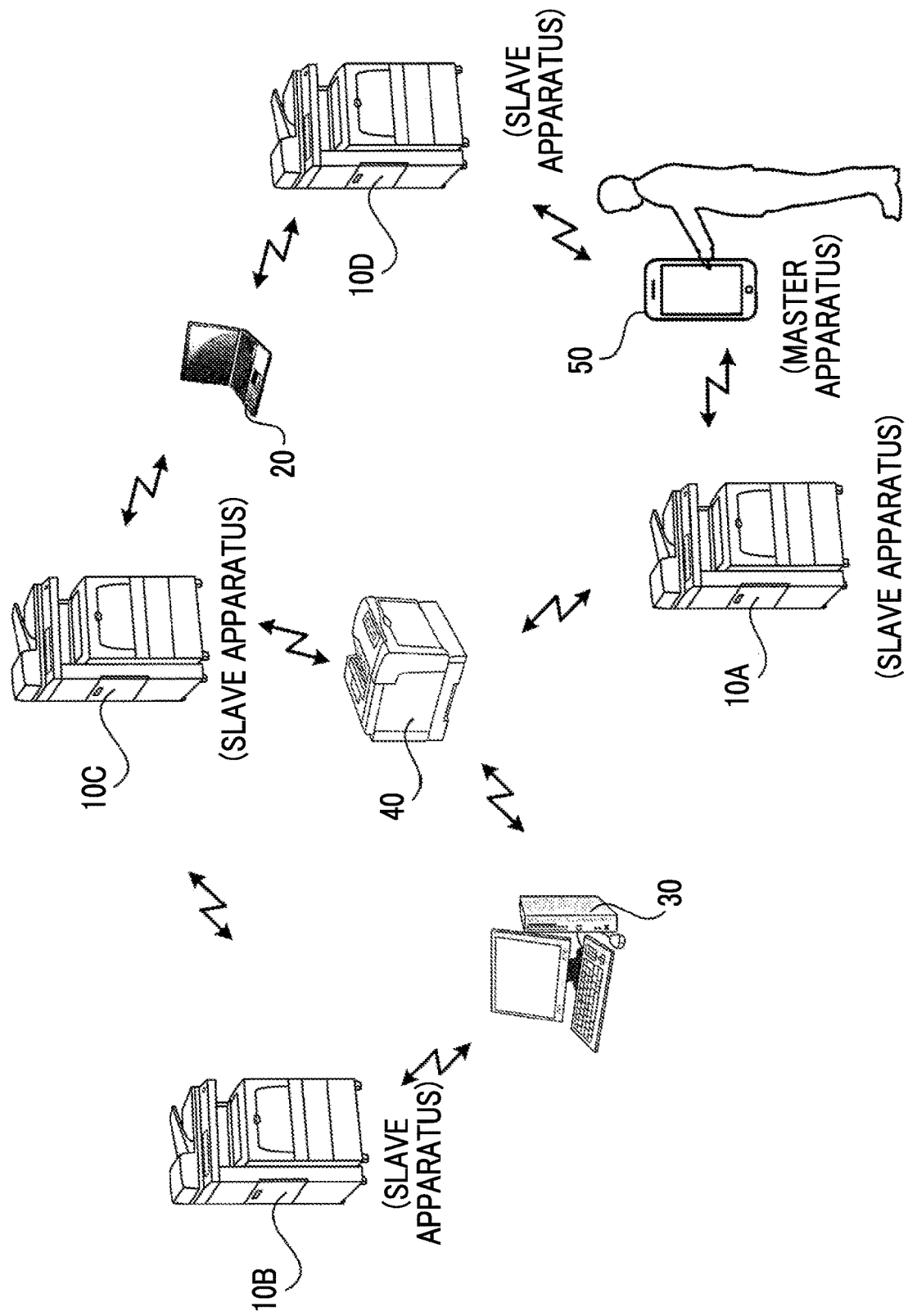
FIG. 16 is a diagram showing a system configuration of an information processing system according to a second exemplary embodiment of the present invention.

FIG. 16 is a diagram showing a system configuration of the information processing system according to the second exemplary embodiment of the present invention.

As shown in FIG. 16, in the information processing system according to the second exemplary embodiment of the present invention, plural image forming apparatuses 10A to 10D, terminal apparatuses 20 and 30 such as personal computers, a printer 40, and a mobile terminal 50 such as a smartphone or a tablet terminal are connected with one another through BLE communication.

In the following description, a case where settings are changed in the information processing system according to the present exemplary embodiment in such a manner that the user uses the image forming apparatuses 10A to 10D as the apparatuses of which the settings are to be changed, generates setting change information by operating the mobile terminal 50 as the master apparatus and transmits the generated setting change information to the image forming apparatuses 10A to 10D as the slave apparatuses will be described.

Figure 17:
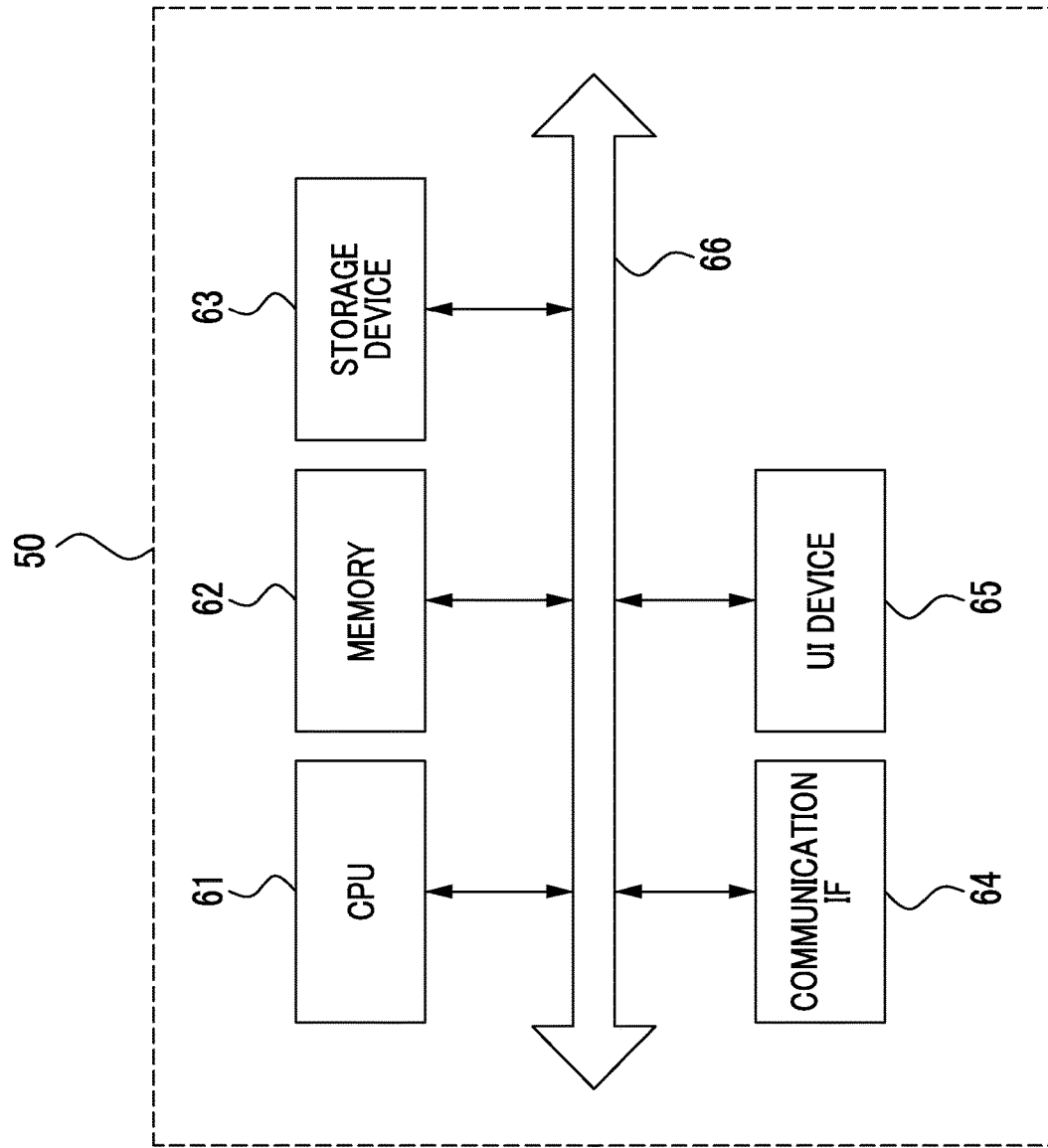
FIG. 17 is a block diagram showing a hardware configuration of a mobile terminal 50 according to the second exemplary embodiment of the present invention.

Hereinafter, a hardware configuration of the mobile terminal 50 according to the present exemplary embodiment is shown in FIG. 17.

As shown in FIG. 17, the mobile terminal 50 includes a CPU 61, a memory 62, a storage device 63 such as a hard disk driver (HDD), a communication interface (IF) 64 that transmits and receives data to and from an external apparatus, and a user interface (UI) device 65 such as a touch panel or a liquid crystal display. These components are connected with one another through control bus 66.

The CPU 61 controls the operation of the mobile terminal 50 by executing predetermined processing based on a control program stored in the memory 62 or the storage device 63. Although it has been described in the present exemplary embodiment that the CPU 61 reads the control program stored in the memory 62 or the storage device 63 and executes the read control program, the program may be provided to the CPU 61 while being stored in a storage medium.

Figure 18:
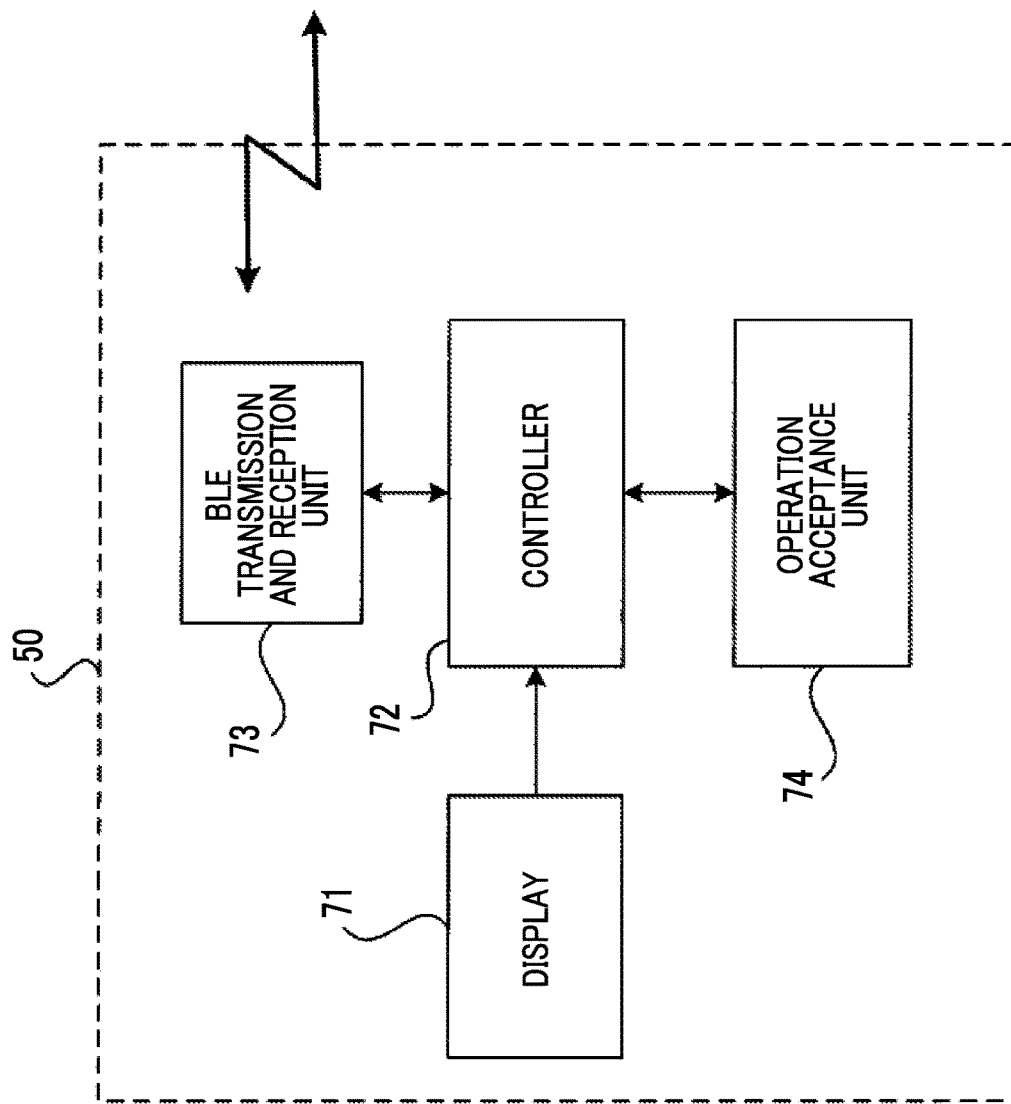
FIG. 18 is a block diagram showing a functional configuration of the mobile terminal 50 according to the second exemplary embodiment of the present invention.

FIG. 18 is a block diagram showing a functional configuration of the mobile terminal 50 realized by executing the control program.

As shown in FIG. 18, the mobile terminal 50 according to the present exemplary embodiment includes a display 71, a controller 72, a BLE transmission and reception unit 73, and an operation acceptance unit 74.

The display 71 displays various information items to the user under the control of the controller 72. The operation acceptance unit 74 accepts various operation information items performed by the user. The display 71 and the operation acceptance unit 74 constitute a so-called touch panel.

The BLE transmission and reception unit 73 transmits and receives data to and from other apparatuses through the aforementioned BLE communication.

The operation acceptance unit 74 accepts an input of the setting change information of the other apparatuses such as the image forming apparatuses 10A to 10D.

The BLE transmission and reception unit 73 transmits the setting change information accepted by the operation acceptance unit 74 to the image forming apparatuses 10A to 10D through the BLE communication which is the communication method in which it is not necessary to specify the communication partner in advance. The BLE transmission and reception unit 73 receives the completion notifications of the setting change transmitted from the image forming apparatuses 10A to 10D through the BLE communication.

The controller 72 performs control such that completion states of the setting change of the image forming apparatuses 10A to 10D are displayed on the display 71 based on the completion notifications of the setting change received by the BLE transmission and reception unit 73. At this time, the controller 72 may perform control such that the completion states and the positional relationships between the mobile terminal and the image forming apparatuses 10A to 10D are displayed on the display 71. It is possible to specify the relative positional relationships between the mobile terminal and the image forming apparatuses 10A to 10D based on the field strength in the BLE communication, for example. That is, it may be determined that the apparatus is present at a distance close to the mobile apparatus in a case where the field strength is strong and the apparatus is present at a distance far away from the mobile terminal in a case where the field strength is weak.

The controller 72 may obtain various information items such as IP addresses of other apparatuses such as the image forming apparatuses 10A to 10D through the BLE communication, and may perform control such that the obtained information items are displayed on the display 71. However, in a case where any of the apparatuses can have a function of obtaining various information items and displaying the obtained information items, there is a security problem. Thus, the image forming apparatuses 10A to 10D that obtain various information items may be set so as to respond to only the BLE communication from a particular apparatus.

Figure 19:
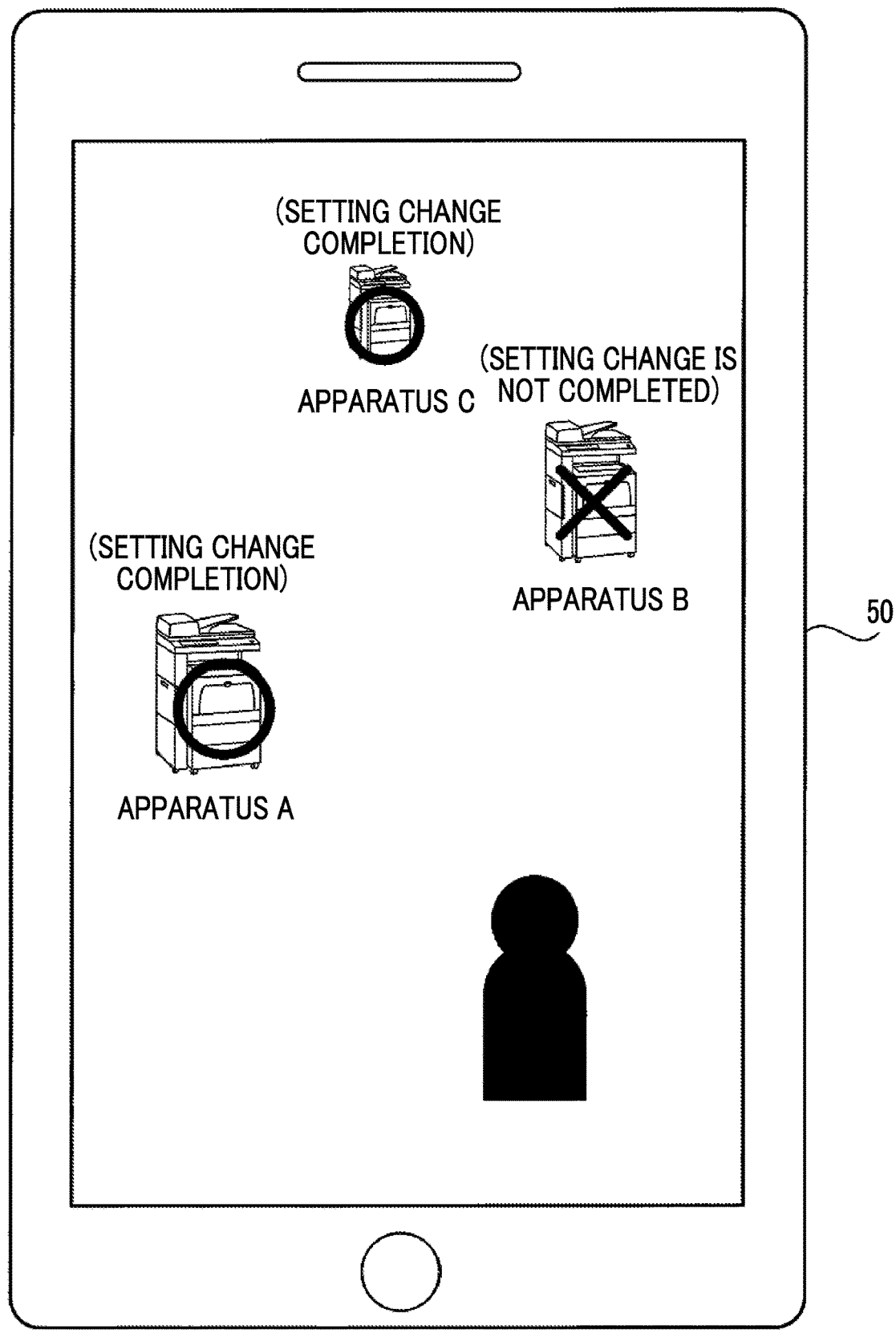
FIG. 19 is a diagram showing a display example displayed on the mobile terminal 50.
Figure 20:
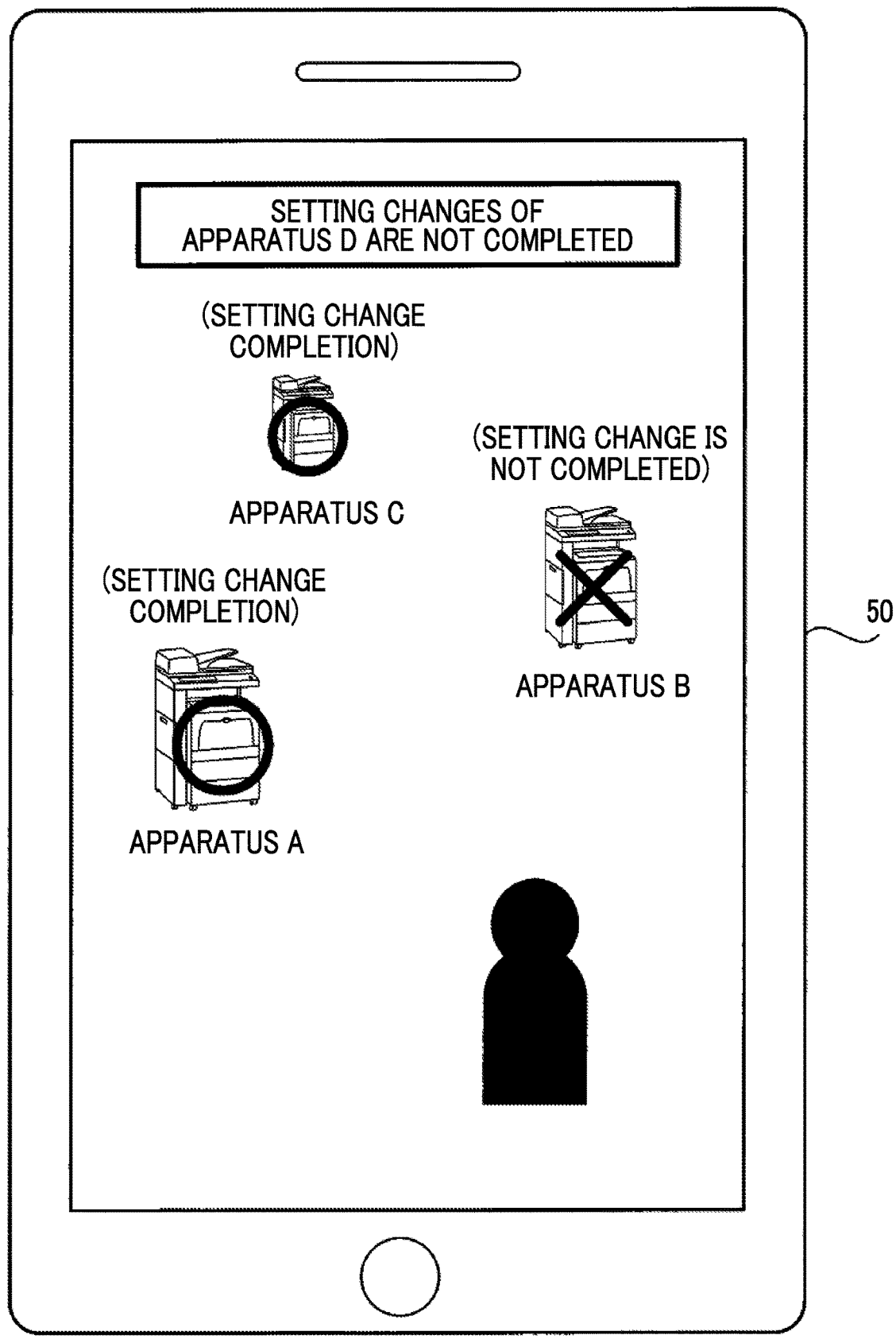
FIG. 20 is a diagram showing a display example displayed on the mobile terminal 50.
Figure 21:
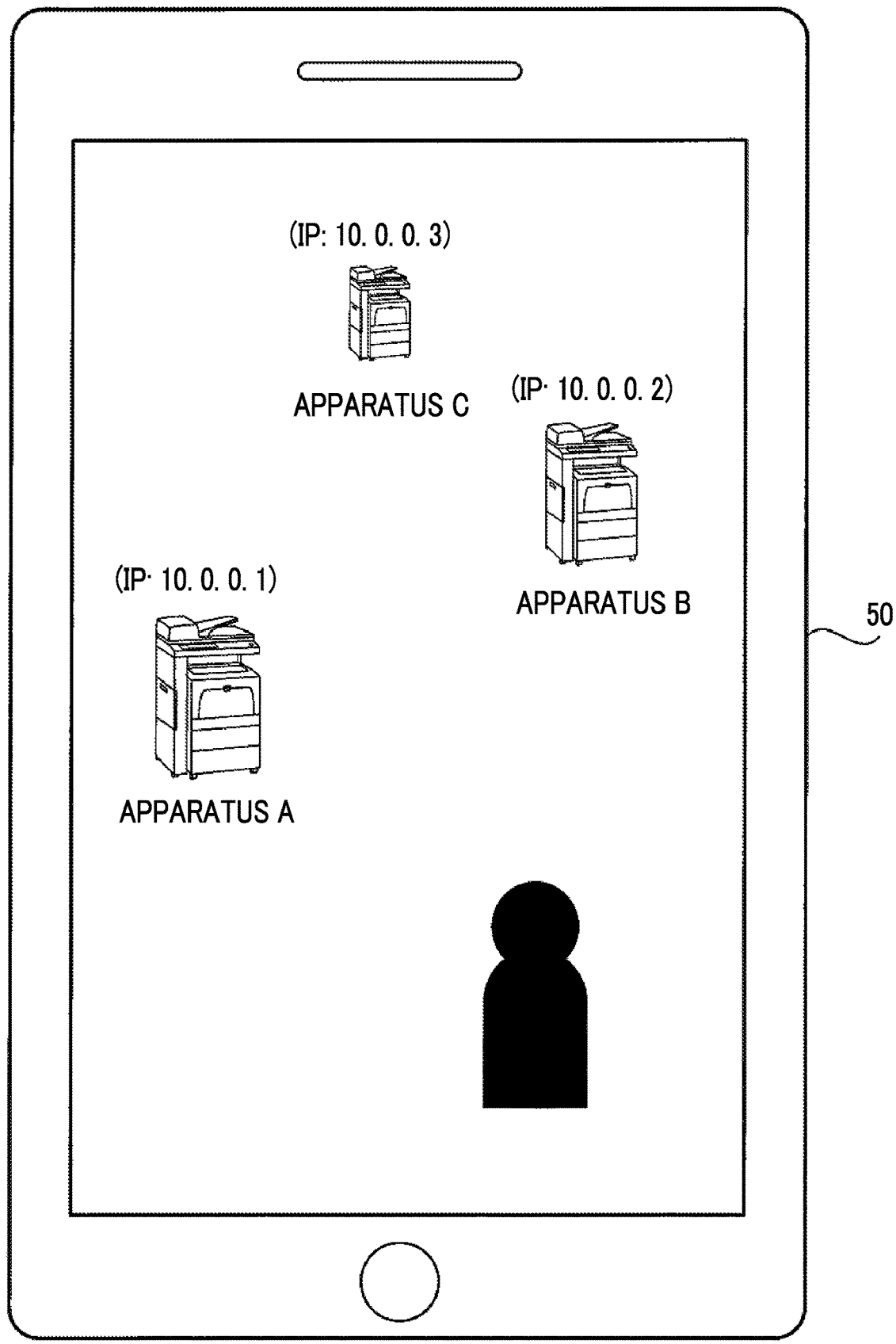
FIG. 21 is a diagram showing a display example displayed on the mobile terminal 50.

Hereinafter, display examples to be displayed on the mobile terminal 50 in this manner are shown in FIGS. 19 to 21.

In the display example shown in FIG. 19, the completion states of the setting change of the apparatuses A to C (the image forming apparatuses 10A to 10C) and the positional relationships between the apparatuses A to C and the mobile terminal 50 are displayed. In FIG. 19, the position of the mobile terminal 50 is shown by the appearance of a person. In FIG. 19, the setting changes in the apparatuses A and C are uneventfully completed, but the setting change in the apparatus B is not completed due to some reasons.

In the display example shown in FIG. 20, a case where the completion state of the setting change of the apparatus D of which the positional relationship with the mobile terminal is not able to be specified is displayed as text information in a pop-up form is illustrated.

A display example in which IP address information items of the apparatuses A to C (the image forming apparatuses 10A to 10C) through the BLE communication and the obtained IP address information items are displayed is shown in FIG. 21. In the display example shown in FIG. 21, it can be seen that the relative positional relationships between the apparatuses A to C and the mobile terminal and the IP address information items obtained from the apparatuses are displayed.

Modification Example

Although it has been described in the aforementioned exemplary embodiments that the apparatuses of which the settings are to be changed are mostly the image forming apparatuses, the present invention is not limited thereto. The present invention may be similarly applied to a case where the apparatuses of which the settings are to be changed are various information processing apparatuses such as a personal computer, a mobile phone apparatus, a tablet terminal apparatus, and a television.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor, configured to:
   accept an input of setting change information of the information processing apparatus;
   change a setting of the information processing apparatus by using the setting change information accepted by the processor; and
   transmit the setting change information accepted by the processor to other apparatuses through BLE communication which is a communication method in which it is not necessary to specify a communication partner in advance,
      wherein the processor transmits the setting change information including an IP address incremented to the other apparatuses.

2. The information processing apparatus according to claim 1,
   wherein the processor transmits the setting change information to the other apparatuses by using an advertising function in the BLE communication.

3. The information processing apparatus according to claim 1,
   wherein, in a case where the setting change information includes a plurality of setting change items, the processor sequentially transmits the setting change information to the other apparatuses for each setting change item.

4. The information processing apparatus according to claim 3, wherein
   the processor receives information items transmitted from the other apparatuses through the BLE communication,
   wherein the processor transmits the setting change information of the next setting change item to the other apparatuses after the processor receives setting change completion notifications from the other apparatuses.

5. The information processing apparatus according to claim 3,
   wherein the processor transmits the setting change information of the next setting change item to the other apparatuses in a case where a predetermined time elapses.

6. The information processing apparatus according to claim 1,
   wherein the processor transmits the setting change information to the other apparatuses after the setting change of the information processing apparatus is completed.

7. The information processing apparatus according to claim 6,
   wherein the processor transmits a setting change completion notification after the setting change information is transmitted to the other apparatuses.

8. The information processing apparatus according to claim 1,
   wherein the processor transmits the setting change information to the other apparatuses irrespective of whether or not the setting change of the information processing apparatus is completed.

9. The information processing apparatus according to claim 1,
   wherein, in a case where the setting change using the setting change information accepted by the processor is a setting change that requires rebooting in order to enable a changed setting content, the processor transmits information indicating that the rebooting is to be performed to the other apparatuses before the information processing apparatus reboots.

10. The information processing apparatus according to claim 9,
    wherein the processor transmits the information indicating that the rebooting is to be performed to the other apparatuses after all setting changes in the information processing apparatus are ended.

* * * * *